United States Patent
Benson et al.

(10) Patent No.: US 11,950,606 B2
(45) Date of Patent: Apr. 9, 2024

(54) C. BOT PREVENTION IN COFFEE

(71) Applicant: Kerflummox Holdings, LLC, Hanover, NH (US)

(72) Inventors: Janice Benson, Etna, NH (US); Oussama Sabky, Dedham, MA (US)

(73) Assignee: KERFLUMMOX HOLDINGS, LLC, Hanover, NH (US)

( * ) Notice: Subject to any disclaimer, the term of this patent is extended or adjusted under 35 U.S.C. 154(b) by 161 days.

(21) Appl. No.: 17/451,119

(22) Filed: Oct. 15, 2021

(65) Prior Publication Data
US 2022/0117251 A1 Apr. 21, 2022

Related U.S. Application Data

(60) Provisional application No. 63/092,810, filed on Oct. 16, 2020.

(51) Int. Cl.
| | | |
|---|---|---|
| *A23F 5/24* | (2006.01) | |
| *A23F 5/40* | (2006.01) | |
| *A23L 3/10* | (2006.01) | |
| *B65B 31/02* | (2006.01) | |
| *B65B 55/06* | (2006.01) | |

(52) U.S. Cl.
CPC ............ *A23F 5/243* (2013.01); *A23F 5/40* (2013.01); *A23L 3/10* (2013.01); *B65B 31/025* (2013.01); *B65B 55/06* (2013.01); *A23V 2002/00* (2013.01)

(58) Field of Classification Search
CPC ... A23F 5/40; A23F 5/243; A23L 3/10; B65B 31/025; B65B 55/06; A23V 2002/00
See application file for complete search history.

(56) References Cited

U.S. PATENT DOCUMENTS

| | | | |
|---|---|---|---|
| 3,821,430 | A | 6/1974 | Reeves |
| 4,107,339 | A | 8/1978 | Shrimpton |
| 4,903,586 | A | 2/1990 | King |
| 9,623,383 | B1 | 4/2017 | Kleinrichert |
| 9,801,405 | B2 | 10/2017 | Kleinrichert |

(Continued)

FOREIGN PATENT DOCUMENTS

| | | |
|---|---|---|
| CA | 1074173 A | 12/1980 |
| ES | 8706380 A1 | 7/1987 |

(Continued)

OTHER PUBLICATIONS

Cockerill, Under Pressure: Modern food and beverages trends drive demand for effective liquid nitrogen dosing technologies:, Gasworld Supplement Food and Beverages, Mar. 2018.

(Continued)

*Primary Examiner* — Anthony J Weier
(74) *Attorney, Agent, or Firm* — Farber LLC; Jonathan Adam Winter

(57) ABSTRACT

A packaged coffee product with oxygen dissolved therein along with milk and/or sweeteners in the sealed packaging is provided. Preferably, the pH of the product is 4.6 or greater, preferably 5.0 or greater. The coffee product may be hot or cold brew coffee and may have other gasses such as nitrogen and/or carbon-dioxide in the sealed container. Ideally, there is oxygen in both the headspace and liquid portion of the beverage in order to inhibit *C. bot* growth without requiring retort processing. Preferably, the calorie count is in the range of 0.5-9 calories per ounce.

24 Claims, 8 Drawing Sheets

(56) References Cited

U.S. PATENT DOCUMENTS

| | | | |
|---|---|---|---|
| 10,368,561 B1* | 8/2019 | Benson | B65D 81/24 |
| 10,925,299 B2* | 2/2021 | Benson | A23L 2/54 |
| 2009/0068313 A1 | 3/2009 | Murota | |
| 2009/0162501 A1 | 6/2009 | Canessa et al. | |
| 2009/0169703 A1 | 7/2009 | Scarola | |
| 2010/0003389 A1* | 1/2010 | Asanuma | A23F 5/46 |
| | | | 426/536 |
| 2010/0009039 A1 | 1/2010 | Robinson et al. | |
| 2010/0104702 A1 | 4/2010 | Hayakawa et al. | |
| 2012/0171333 A1 | 7/2012 | Crump et al. | |
| 2014/0234488 A1 | 8/2014 | Chang | |
| 2015/0335055 A1 | 11/2015 | Smith et al. | |
| 2016/0007626 A1 | 1/2016 | Choi et al. | |
| 2017/0231245 A1 | 8/2017 | Mangigian | |
| 2018/0064126 A1 | 3/2018 | Woodall | |
| 2018/0213824 A1 | 8/2018 | Schacht et al. | |
| 2021/0169105 A1* | 6/2021 | Benson | A23F 5/24 |

FOREIGN PATENT DOCUMENTS

| | | |
|---|---|---|
| GB | 998420 A | 7/1965 |
| GB | 2390355 A | 1/2004 |
| JP | S62107745 A | 5/1987 |
| JP | 2006290386 A | 10/2006 |
| JP | 2008067692 A | 3/2008 |
| JP | 2008143570 A | 6/2008 |
| KR | 100572177 A | 4/2006 |
| WO | 2017165365 | 9/2017 |

OTHER PUBLICATIONS

Coffee Acidity and Processing. 2009. https://www.coffeechemistry.com/news/science-technology/coffee-acidity-and-processing.

Drips & Draughts, "Lessons Learned While Exploring Cold Brew Production Approvals With A Process Authority", Sep. 2, 2016; Retrieved from the internet on May 10, 12018. https://www.dripsanddraughts.com/022-lessons-learned-while-exploring-cold-brew-production-approvals-with-a-process-authority/.

Food and Drug Administration; "Death Wish Coffee Co. Announces Recall of Nitro Cold Brew Cans From Retailers, Online Sales", Recalls, Market Withdrawals, & Safety Alerts; Sep. 19, 2017. Retrieved from the internet on May 10, 2018. https://www.fda.gov/Safety/Recalls/ucm576809.htm.

Food and Drug Administration. "Guidance for Industry on Refrigerated Carrot Juice and Other Refrigerated Low-Acid Juices." (2007): 214-232. Retrieved from the internet on May 10, 2018; https://www.fda.gov/Food/GuidanceRegulation/ucm072481.htm.

Food and Drug Administration. "Guidance for Commercial Processors of Acidified & Low-Acid Canned Foods." last updated Mar. 14, 2018. Retrieved from the internet on May 10, 2018. https://www.fda.gov/Food/GuidanceRegulation/GuidanceDocumentsRegulatoryInformation/AcidifiedLACF/default.htm.

"FSMA Part 3: Cold brew and what we need to know from brewing, storing and distributing and our continued dialogue with Ms. Schaffner"; Nov. 8, 2017; Retrieved from internet on May 10, 2018; https://www.royalnylab.com/blog/2017/11/8/fsma-part-3-cold-brew.

Fuller, Megan, and Niny Z. Rao. "The Effect of Time, Roasting Temperature, and Grind Size on Caffeine and Chlorogenic Acid Concentrations in Cold Brew Coffee." Scientific reports 7.1 (2017): 17979.

Metcalf; "The Life of Cold Brew Coffee"; LinkedIn; https://www.linkedin.com/pulse/life-cold-brew-coffee-justin-metcalf, retrieved from internet Mar. 26, 2018; 3 pages.

Peck, M. W., et al. "Clostridium botulinum in vacuum and modified atmosphere packed (MAP) chilled foods (Project B13006) Institute of Food Research UK." Executive summary (2006).

Provincial Health Services Authority; "Nitro cold brew coffee food safety risks"; Nov. 2017; 6 pages.

U.S. Department of Health and Human Services Food and Drug Administration Center for Food Safety and Applied Nutrition; Low-Acid Foods Packaged in Hermetically Sealed Containers (LACF) Regulation and the FDA Food Safety Modernization Act: Guidance for Industry, Aug. 2017.

UCSB Science Line. 2006. http://scienceline.ucsb.edu/getkey.php?key=1307.

US Food and Drug Administration. "Hazard analysis and riskbased preventive controls for human food: Draft guidance for industry." (2016).

US Food and Drug Administration. "Hazard analysis and riskbased preventive controls for human food: Draft guidance for industry." (Jan. 2018).

Whiting, R. C., and K. A. Naftulin. "Effect of headspace oxygen concentration on growth and toxin production by proteolytic strains of Clostridium botulinum." Journal of food protection 55.1 (1992): 23-27.

International Search Report & Written Opinion for Application No. PCT/US 21/55438 dated Jan. 27, 2022.

* cited by examiner

Using Henry's Law $$K_H O_2 = 769.23 \text{ atm}/M$$

$$K_H O_2 = \frac{PO_2}{O_2(aq) \leftarrow \text{dissolved oxygen}}$$

From Testing results:

$$O_2(aq) = 2.34 \text{ ppm} = 2.34 \text{ mg}/L = 0.00234 \text{ g}/L$$

$$O_2 \text{ Molar Mass} = 16 \text{ g}/mol$$

$$= \frac{0.00234 \text{ g}/L}{16 \text{ g}/mol}$$

$$= 0.0001462 \text{ M}$$

$$PO_2 = O_2(aq) * K_H O_2$$

$$= 0.0001462 \text{ M} * 769.23 \text{ atm}/M$$

$$= 0.1125 \text{ atm}$$

So headspace is: if can is 1 atm, oxygen = 11.25%

2 atm, oxygen = 5.625%

3 atm, oxygen = 3.75%

FIG. 4

Nitrogen Dosing Calculations $$K_HN_2 = \frac{PN_2}{N_2(aq)} = 1639.34 \text{ atm}/M$$

Assuming 5% $O_2$ in headspace

95% $N_2$ in headspace

At 1 atm:

$$PN_2 = \frac{(0.95)(1 \text{ atm})}{N_2(aq)}$$

$$N_2(aq) = \frac{(0.95)(1 \text{ atm})}{1639.34 \text{ atm}/M} = 0.0006M$$

At 2 atm:

$$PN_2 = \frac{(0.95)(2 \text{ atm})}{N_2(aq)}$$

$$N_2(aq) = \frac{(0.95)(2 \text{ atm})}{1639.34 \text{ atm}/M} = 0.0012M$$

At 3 atm:

$$PN_2 = \frac{(0.95)(3 \text{ atm})}{N_2(aq)}$$

$$N_2(aq) = \frac{(0.95)(3 \text{ atm})}{1639.34 \text{ atm}/M} = 0.0018M$$

FIG. 5

Determination of $O_2$ Infusion Pressure $$K_H = \frac{PO_2}{O_2(aq)}$$

- Goal is to achieve 3% $O_2$ in headspace

- Can pressure after nitrogen dosing is known to be 30-35 psi (2-2.3 atm)

Therefore:

$$(0.03)(2 \text{ atm}) < PO_2 < (0.03)(2.3 \text{ atm})$$
$$(0.06 \text{ atm}) < PO_2 < (0.07 \text{ atm})$$
$$0.9 \text{ psi} < PO_2 < 1.05 \text{ psi}$$

We chose 1 psi as infusion pressure

Examine upper limits:

- To achieve 5% $O_2$ in headspace:

$$(0.05)(2 \text{ atm}) < PO_2 < (0.05)(2.3 \text{ atm})$$
$$(0.10 \text{ atm}) < PO_2 < (0.115 \text{ atm})$$
$$1.5 \text{ psi} < PO_2 < 1.725 \text{ psi}$$

- To achieve safety factor oxygen level in headspace increase $O_2$ infusion pressure to 1.5 -1.7 psi.

FIG. 6

C. BOT PREVENTION IN COFFEE

FIELD OF THE INVENTION

The following relates to inhibiting growth of certain bacterium in coffee products. More particularly, the following relates to inhibiting *Clostridium botulinum* (*C. bot*) in low acid cold beverages, particularly nitro coffees and cold brew coffees.

BACKGROUND OF THE INVENTION

Iced coffee has risen in popularity over the last decade. Iced coffee is standard hot brewed coffee that is chilled or served over ice.

An alternative to iced coffee is cold brew coffee. As compared to standard hot brewed coffee, cold brew coffee has a delicate flavor profile that is less acidic than hot brewed coffee. For this reason, some prefer cold brew coffee over hot brew coffee.

Recently, nitrogen infused cold brew coffee products have become popular, especially in single use cans. Nitro cold brew (NCB) coffee is an emergent food trend for ground, roasted coffee beans filtered slowly (steeped) through a cold, room temperature, or hot-bloom water brewing process for 8 or more hours (upper range ~36 hours). The beverage is stored anaerobically in cans or stainless steel kegs, and charged with nitrogen gas. The nitrogen gas infusion may be similar to the nitrogen widgets used for canned Guinness beer, and imparts small bubbles to the beverage which do not easily dissolve in water. This results in a creamy frothy head, imparting sweetness, less acidic taste and giving a fuller, thicker mouth feeling to NCB beverages when compared to regular coffee brews. Since the single use can product is relatively new, food safety requirements have been evolving.

Cold Brew Coffee spoilage is characterized by undesirable coffee characteristics identified as increasing acidity, off notes, and dull flavor which result in a souring over time that is accompanied by aroma changes which typically involve decreasing coffee aromas and eventually resulting sour aroma notes. Typical home brews may last 14-30 days in refrigeration, while industrial large-scale brewers are achieving about 90 days in cans and bottles in refrigerated storage conditions. However, 90 days shelf life for a commercial product limits its distribution channels and its availability in certain markets.

Recently, it has been discovered that growth of certain bacterium can be a problem in these products. Particularly, *Clostridium botulinum* (*C. bot*) has become a concern to both producers and regulators. The Food and Drug Administration (FDA) has become concerned with *C. bot* in cold brew coffee products. Current FDA guidelines on the prevention of *C. bot* in chilled products provide for several ways to inhibit growth. These processing guidelines for products with more than 10 day shelf life include: a heat treatment of 90° C. for 10 minutes or equivalent lethality at the slowest heating point in the food; a pH of 5.0 or less throughout the food and throughout all components of complex foods; a minimum salt level of 3.5% in the aqueous phase throughout the food and throughout all components of complex foods; a water activity (aw) of 0.97 or less throughout the food and throughout all components of complex foods; a combination of heat and preservative factors which can be shown consistently to prevent growth and toxin production by non-proteolytic *C. botulinum.*

Thus, the existing guidelines that can be applied to a beverage include adding salt to a 3.5% salinity, producing a more acidic product (pH below 5.0), and heating the product in the packaging to 90° C. or higher for 10 minutes.

All of the foregoing, although capable of inhibiting *C. bot* growth in cold brew nitro coffee, have the downside of altering the flavor profile of the product, which may result in an unsatisfactory taste to the consumer.

For example, heat can leave the cold brew coffee with a bitter and yeasty taste and a nitrogen dosed can has pressure limitations to the can due to the existing positive pressure already in that can at chilled temperatures. Salt is not an option as it would alter the flavor and, while it may be possible to increase the acidity, this has the downside of departing from the flavor profile that makes nitrogen infused cold brew coffee a popular product. Cold brew coffee typically has a pH range of 5.5-6.5 and since the pH scale is logarithmic, a significant amount of acid would need to be added to get the beverage below pH 5.0.

US 2017/0231245 discloses a ready-to-drink cold brew coffee product with a shelf life up to one year without refrigeration before consumption. However, the method of preparation involves heating a cold brewed mixture to a temperature of less than 100° C. for less than 1 minute to thereby form a pre-fill coffee composition. After heating, the method includes pouring and increasing a temperature of the pre-fill coffee composition to at least 82.2° C. and holding the coffee composition at the temperature of at least 82.2° C. for at least 30 seconds to form a filled coffee composition. As mentioned, this has the potential to affect the flavor profile of the cold brew. Moreover, the method does not address nitrogen dosing of the coffee.

The nitro coffee industry has generally believed that the addition of the nitrogen is not only important to provide for the gentle bubbled profile of the beverage but to also displace oxygen to inhibit growth of bacteria—particularly aerobic bacteria. Thus, the industry has generally tried to avoid oxygen within the canned coffee product. Oxygen also has another downside in that its presence generally limits shelf life in that the food processing industry often tries to remove oxygen in order to prolong shelf life.

Thus, both the food industry and the more niche nitro brew industry has sought to avoid oxygen. However, this lack of oxygen actually encourages *C. bot* growth as the bacterium thrives in an anaerobic environment.

Many of these problems also exist in hot brew coffee which is chilled and packaged. To solve the *C. bot* problem, many packaging facilities will use retort processing which is a very high heat, typically in the range of 225 deg F. or more. This processing will often ruin the flavor profile of the coffee which results in needing higher quantities of sweeteners or flavoring to make the end product taste good. Retort processing is also relatively expensive compared to lower temperature pasteurization at e.g. 165 deg F. at least because lower temperatures require less heat (energy).

Therefore, there exists a need for a coffee product whether hot or cold brew coffee along with a processing method and system that inhibits *C. bot* growth while preserving the flavor profile and at the same time providing for suitable shelf life and longevity of flavor.

There further exists a need for methods of manufacturing coffee products and nitro coffee products, whether cold brewed, hot brewed, or iced, that inhibit *C. bot* growth and provide for suitable shelf life of the packaged product.

There exists a need for flavored coffee and nitro brew coffee that is shelf stable for greater than 90 days.

There exists a need for coffee products that are shelf stable for greater than 90 days.

SUMMARY OF THE INVENTION

Therefore, it is an object of the invention to supply a processing method that inhibits growth of C. bot in coffee products, and in particular nitro coffee products and coffee products with added sweetners, flavorings and e.g. milk, for which there is a desired shelf life of greater than 10 days.

It is further an object of the invention to supply a processing method that produces coffee products including cold brew and/or nitro coffee products that are shelf stable for at least 180 days.

It is also an object of the invention to inhibit growth of C. bot in coffee products, including but not limited to nitro and nitro cold brew coffee products, for which there is a desired shelf life of greater than 10 days.

It is an object of the invention to supply a processing method that produces coffee products, including but not limited to cold brew coffee products, that are shelf stable for at least 180 days.

It is a further object of the invention to inhibit growth of C. bot in pressurized canned low acidity beverages for which there is a desired shelf life of greater than 10 days, preferably 180 days or more.

It is a further object of the invention to enable use of processing techniques which do not require the high temperatures associated with retort processing but still inhibit growth of *C. bot* and also have stable and improved flavor while reducing the calorie count of these beverages, especially flavored/sweetened ones.

Yet another object of the invention is to provide a shelf stable low acid beverage (e.g. coffee) which is in a sealed container and contains flavorings such as milk, sweeteners etc but still maintains relatively low caloric content.

"milk" as used herein refers to any type of milk whether animal or plant based, including but not limited to the examples described in the specification and "flavor additive" refers to a non-coffee based flavoring, including but not limited to the examples described in the specification.

These and other objects are achieved by provision of a method of manufacturing shelf stable nitro-cold brew coffee comprising dissolving oxygen into a liquid coffee product brewed at a temperature of less than 50° C.; dispensing nitrogen into the oxygenated coffee; and packaging said liquid coffee product with oxygen and nitrogen dissolved therein into a sealed container. The method produces product that is shelf stable at refrigerated conditions for at least 180 days.

Other objects are achieved by providing a method of manufacturing shelf stable low acid beverages such as coffee or others where the coffee includes dissolved oxygen therein along with the addition of caloric additives such as milk, sweeteners or others. Preferably the caloric content is in the 0.5-9 calories per ounce range or possibly narrower range and most preferably high temperatures and particularly retort temperatures and processing is not used. By eliminating or not using high temperatures, a more gentle pasteurization can be used which results in the underlying flavor of the coffee not being destroyed by high temperature processing. Normally a high temperature treated coffee would require significantly more flavorings and sweeteners to overcome the damage caused by high temperature processing. Therefore the combined use of oxygen, the low acid beverage (e.g. coffee), and caloric additives in modest amounts (e.g. 0.5-9 calories/oz, 0.5-8, 0.5-7, 0.5-6, 0.5-5, 0.5-4, 0.5-3, 0.5-2 cal/oz) has been found to allow for both improved flavor, lower calories and longer shelf life with that improved flavor. The industry has historically believed that the addition of oxygen into the low acid beverage sealed container will ruin the flavor of these types of beverages, in contradiction to that belief, the inventors have discovered, somewhat unexpectedly, that use of oxygen actually allows for enhanced flavor along with non-cold chain transportation, however cold chain transportation can be used. The term calorie or cal refers to the unit of measure commonly found on US consumer nutrition labels which really is kilocalories or kcal. In some embodiments the can includes coffee, a milk product, carbohydrate sweetener, infused oxygen and without other additions to the beverage. Particularly, the nutrition facts listing could only be required to contain three ingredients, possibly 4 ingredients (if nitrogen is listed) and does not require listing "natural flavors" or "artificial flavors" and does not require the addition of coffee flavor additives.

In some embodiments, the method further comprises the step of chilling the coffee prior to the step of dissolving oxygen and nitrogen. In some of those embodiments, the chilling step includes holding at 33-38° F. for about 24 hours. In other embodiments, the chilling step includes holding at about 35° F. for at least 22 hours.

In certain embodiments, the step of dissolving oxygen occurs until the oxygen level reaches 18-36 ppm. In certain of those embodiments, the step of dissolving oxygen occurs until the oxygen level reaches 20-22 ppm.

In some embodiments, the brew temperature of the liquid coffee product is room temperature.

In certain embodiments, the container has a headspace substantially including only oxygen and nitrogen. In certain of those embodiments, the partial pressure percentage of oxygen in a can is less than 10%.

In some embodiments, during or after the step of dissolving oxygen and prior to the step of dissolving nitrogen, the coffee is recirculated in a holding tank.

In some embodiments, the method further comprises the step of heating the sealed container to about 145° F. for about 3 minutes. In other embodiments, the method further comprises the step of heating the sealed container to about 145° F. for at least 3 minutes. Temperatures of 150° F., 155° F., 160° F., 165° F. are all contemplated in the alternative. Longer times can also be used as well.

In certain embodiments, the liquid coffee product contains about 1-4%, more particularly 1.2 to about 4% or 1.4% to about 4% total dissolved solids. In certain of those embodiments, the liquid coffee product contains 1.4% to 2.0% total dissolved solids.

In some embodiments, the liquid coffee product is brewed over 17 to 24 hours. In some embodiments the brewing time is 12-14 hours, however it is contemplated that shorter brewing times could be used or techniques to speed up brewing of cold brew coffee could also be applied. Hot brewed coffee typically will brew in a short amount of time, typically in a few minutes.

In certain embodiments, the liquid coffee product has a pH of 4.6 to 5.2.

In some embodiments, a total pressure of a gaseous portion of the sealed container in atmospheres times the partial pressure percentage of oxygen defines a pressure ratio which is 0.03-0.16. In some of those embodiments, the pressure ratio is approximately 0.1125.

In another aspect, the invention provides a shelf stable nitro-cold brew coffee product comprising a sealed container comprising a liquid portion and a headspace; the liquid portion comprising coffee brewed at a temperature less than 50° C. with oxygen and nitrogen dissolved therein; the headspace containing oxygen and nitrogen gas; wherein the product is free of *Clostridium botulinum* (*C. bot*). In some embodiments, an interior space of the sealed container consists essentially of a liquid portion and a headspace. The coffee product is shelf stable for at least 180 days at refrigerated conditions.

In some of those embodiments, the coffee is brewed at ambient temperature.

In certain embodiments, the product has pH 4.6 to 6.5.

In some embodiments, the liquid portion contains about 1.4% to about 4% total dissolved solids. In some of those embodiments, the liquid portion contains 1.4% to 2.0% total dissolved solids.

In preferred embodiments, the container is a can or a keg.

In certain embodiments, the liquid portion contains 18-20 ppm oxygen at equilibrium.

In yet another aspect, the invention comprises a method of manufacturing a cold brew coffee product comprising: dissolving oxygen into a liquid coffee product brewed at a temperature less than 50° C. and packaging said liquid coffee product with oxygen dissolved therein into a sealed container.

In some embodiments, the method further comprises feeding a coffee product brewed at a temperature less than 50° C. from a vat into the container, wherein between the vat and container, the dissolving step occurs; dispensing a non-oxygen gas into the container; and sealing the container.

In certain embodiments, the dispensing step is done at a first rate measured in gallons per minute (gpm) and the dissolving step is accomplished by supplying a pressure of oxygen at a second rate measured in positive net pounds per square inch (psi) into an infuser such that the first rate divided by the second rate is a ratio in the range of 0.1-10 gpm/psi. In some of those embodiments, the ratio is 1-8 gpm/psi or 1-5 gpm/psi. In certain of those embodiments, the ratio is approximately 2 gpm/psi.

In some embodiments, after the step of dissolving, and prior to the step of packaging, the coffee is recirculated in a holding tank until the coffee having dissolved oxygen therein reaches an oxygen level of 10-40 ppm, more preferably 20-40 ppm.

In certain preferred embodiments, the container has a headspace substantially including only oxygen and a non-oxygen gas. In especially preferred embodiments, the non-oxygen gas is nitrogen.

In some embodiments, the sealed container has a partial pressure percentage of oxygen of at least 3% but less than 10%.

In certain embodiments, a total pressure of a gaseous portion of the sealed container in atmospheres times the partial pressure percentage of oxygen defines a pressure ratio which is 0.03-0.16. In some of those embodiments, the pressure ratio is approximately 0.1125.

In some embodiments, the container is a single use container. In certain embodiments, the container is a metal can. In other embodiments, the container is a glass bottle. In yet other embodiments, the container is a plastic bottle.

In certain embodiments, the brew temperature of the coffee is less than 30° C. In some preferred embodiments, the brew temperature is less than 15° C., more preferably 3-15° C. The invention further comprises a cold brew coffee product comprising a sealed container comprising a liquid portion and a headspace; the liquid portion comprising coffee brewed at a temperature less than 50° C. with a non-oxygen gas dissolved therein; the headspace containing at least approximately 3% oxygen and an amount of a non-oxygen gas. The product has a shelf life greater than 10 days and remains free of *C. bot* when stored at refrigerated conditions.

In preferred embodiments, the non-oxygen gas is nitrogen.

In some embodiments, the cold brew coffee product headspace has a total pressure between 1-4 atmospheres when the liquid portion is at a temperature of 3° C.

In certain embodiments, the gaseous portion contains approximately 3-6% oxygen.

In some embodiments, the liquid portion has a pH of 4.6 or greater, preferably 5.0 or greater, most preferably 5.5 to 6.5.

In certain embodiments, the coffee is brewed at less than 30° C. In some of those embodiments, the coffee is brewed at less than 25° C. In certain of those embodiments, the coffee is brewed at less than 15° C., most preferably 3-15° C.

In some embodiments, the coffee product exhibits 90 days of shelf life protected from *C. bot* growth.

In certain embodiments, the shelf life of a coffee product according to the invention stored at <10° C. is 180 days. In preferred embodiments, the coffee is shelf stable for 180 days at refrigerated conditions.

In certain embodiments, the shelf life of a coffee product according the invention will have a shelf life of 30 days, 60 days, 90 days, 120 days, 180 days, 270 days or 365 days, depending on storage conditions. In certain preferred embodiments, the product exhibits shelf life of 30 days, 60 days, 90 days, 120 days, 180 days, 270 days or 365 days upon storage at refrigerated conditions.

In other embodiments, the shelf life of a coffee product according the invention will have a shelf life of 1 month, 2 months, 3 months, 4 months, 5 months, 6 months, 7 months, 8 months, 9 months, 10 months, 11 months, or 12 months. In certain preferred embodiments, the product exhibits shelf life of 3 months, 4 months, 5 months, 6 months, 7 months, 8 months, 9 months, 10 months, 11 months, or 12 months upon storage at refrigerated conditions.

The invention also comprises a method of manufacturing a stable nitrogen infused coffee product comprising the steps of dissolving oxygen into a liquid coffee product; packaging the coffee product having dissolved oxygen therein into a container; dispensing nitrogen into the container to produce a nitrogen infused coffee product; and sealing the container, wherein the nitrogen infused coffee product remains free of *C. bot* when stored at refrigerated conditions.

In some embodiments of this method, the coffee product having dissolved oxygen therein contains 10-40 ppm oxygen. In some of those embodiments, the coffee product having dissolved oxygen therein contains 20-40 ppm oxygen.

In some embodiments, the sealed container has a partial pressure percentage of oxygen of at least 3% but less than 10%.

In certain embodiments, the nitro coffee product is dispensed into a can.

In some embodiments of the nitro infused method, the dispensing step is done at a first rate measured in gallons per minute (gpm) and the dissolving step is accomplished by supplying a pressure of oxygen at a second rate measured in pounds per square inch (psi) into an infuser such that the first rate divided by the second rate is a ratio in the range of 0.1-10 gpm/psi.

Still other objects are achieved by providing a method of manufacturing shelf stable coffee product such as flavored/ sweetened coffee which may be hot brew or cold brew or nitro-cold brew coffee comprising dissolving oxygen into a liquid coffee product; adding flavoring and/or sweeteners to the coffee product; and packaging said flavored/sweetened coffee product with oxygen dissolved therein into a sealed container and heating the packaged product to a temperature less than 100 deg C./212 deg F. More particularly, the maximum temperature the product is exposed to is 180 deg F. or less or more particularly 170 deg F. or less or even more particularly 165 deg F. or less. The method produces product that is shelf stable at refrigerated conditions for at least 180 days. In certain embodiments, the flavored/sweetened coffee product has a caloric content of 8 calories per ounce or less, more particularly between 0.5-8 calories per ounce or even more particularly 1-6 calories per ounce.

In certain embodiments a method of manufacturing shelf stable packaged coffee is provided including steps of: dissolving oxygen into a liquid coffee product; and packaging the liquid coffee product with oxygen dissolved therein into a sealed container along with one or more of: milk, flavor additives, carbohydrate sweetener and artificial sweetener, to create a packaged coffee product with a pH of 4.6 or greater.

In some embodiments the carbohydrate sweetener is selected from the group consisting of sucrose, glucose, fructose, xylose, fructose-glucose syrup sugar alcohol, and cyclodextrins. In some embodiments the artificial sweetener is selected from the group consisting of saccharin, cyclamate, aspartame, acesulfame potassium, sucralose, mannitol, sorbitol, xylitol, stevia and peptide sweeteners. In other embodiments the milk is selected from the group consisting of: raw milk, sterilized milk, powdered whole milk, powdered nonfat milk, fresh cream, concentrated milk, nonfat milk, partially nonfat milk, condensed milk and plant-based milk. In other embodiments the packaged coffee product includes milk and/or carbohydrate sweetener and has a caloric content of 9 calories per ounce or less.

In other embodiments the dissolving step includes infusing the oxygen inline into the liquid coffee product while said liquid coffee product flows through a packaging line. In still other embodiments, the dissolving step includes infusing the oxygen into the liquid coffee product. In other embodiments the infusing includes delivering pressurized oxygen to a coffee moving through a canning line and using a pressure regulator to control a quantity of oxygen dissolved into the coffee. The infusing could also occur in a tank. In certain cases levels greater than 36 ppm of oxygen can be useful, more particularly more than 45 ppm or more than 50 ppm of oxygen can be useful especially in coffees with added carbohydrate sweeteners and/or milk.

In still other embodiments the method includes shipping said packaged liquid coffee product and such that prior to shipping said packaged liquid coffee product has been subject to temperatures less than 100 deg Celsius while in the sealed container. In other aspects the method includes the step of chilling the coffee prior to the step of dissolving oxygen. In certain embodiments the chilling step includes holding at 33-38° F. for about 24 hours. In other embodiments the step of dissolving oxygen occurs until the oxygen level reaches 18-36 ppm. Optionally, the oxygen could be dissolved at the higher levels described herein. In still other embodiments the packaged coffee product contains a liquid portion with dissolved oxygen therein and a headspace portion with oxygen therein. In certain aspects, the coffee is cooled down from its brewing temperature and remain at or slightly above ambient temperature such that the levels of oxygen described in this application can be incorporated by infusing. Chilling is sometimes preferred because oxygen dissolves better in colder liquids, but room temperature or reasonably close thereto such that oxygen can be dissolved to desired levels can be used so that the extra energy required to chill the coffee is not required.

In other embodiments the container is a metal can. In still other embodiments the container is a bottle. In additional embodiments, the method includes the step of heating the sealed container to about 145° F. for at least 3 minutes. In certain embodiments the liquid coffee product has a pH of 4.6 to 5.2.

In other embodiments a packaged coffee product is provided including a sealed container with a liquid portion comprising coffee with oxygen dissolved therein. The product is free of *Clostridium botulinum* (C. bot) and the liquid portion further includes one or more of the group consisting of: milk, carbohydrate sweetener and artificial sweetener, to create the packaged coffee product with a pH of 4.6 or greater. It is understood that the milk products or any other products susceptible to pathogens which are added would separately be pasteurized prior to being added to the coffee using techniques typical in their respective industries. For example, milk processing and pasteurization techniques used in that industry are known in the art and would be used on milks added prior to that addition.

In certain embodiments the liquid portion has 0.5-9 calories per ounce. In other embodiments the liquid portion has 2-7 calories per ounce. In still other embodiments the liquid portion has 2-5 calories per ounce.

In certain embodiments the liquid portion contains 18-20 ppm oxygen at equilibrium or higher or lower levels described herein. In some cases, the oxygen is dissolved to reach e.g. 18-36 ppm or higher (or lower) levels contemplated herein and after a few weeks the oxygen will chemically react with the contents of the can, including the coffee and the level of oxygen may drop 50% or more, for example, oxygen content after three weeks may be 1-10 ppm, more particularly 1-5 ppm or even more particularly 1-3 ppm. In other embodiments the sealed container includes a headspace portion containing oxygen. In other embodiments the sealed container with the packaged coffee product therein is not exposed to temperatures above 212 deg more particularly is not exposed to temperatures above 180 deg F.

In other embodiments a method of manufacturing shelf stable packaged coffee includes dissolving oxygen into a liquid coffee product; and packaging said liquid coffee product with oxygen dissolved therein into a sealed container along with one or more of the group consisting of: milk, flavor additives, carbohydrate sweetener and artificial sweetener, to create a packaged coffee product wherein the packaged coffee product has a pH of 4.6 or greater and the packaged coffee product has a caloric content of 0.5-9 calories per ounce.

In certain aspects the carbohydrate sweetener is selected from the group consisting of sucrose, glucose, fructose, xylose, fructose-glucose syrup sugar alcohol, cyclodextrins and combinations thereof. In other aspects, the artificial sweetener is selected from the group consisting of saccharin, cyclamate, aspartame, acesulfame potassium, sucralose, mannitol, sorbitol, xylitol, stevia, peptide sweeteners and combinations thereof. In other aspects, the milk is selected from the group consisting of: raw milk, sterilized milk, powdered whole milk, powdered nonfat milk, fresh cream, concentrated milk, nonfat milk, partially nonfat milk, condensed milk, plant-based milk and combinations thereof. In other aspects the packaged coffee product includes milk and carbohydrate sweetener.

In yet other aspects the dissolving step includes infusing the oxygen inline into the liquid coffee product while said liquid coffee product flows through a packaging line. In still other aspects the dissolving step includes infusing the oxygen into the liquid coffee product. In other aspects the infusing includes delivering pressurized oxygen to a coffee moving through a canning line and using a pressure regulator to control a quantity of oxygen dissolved into the coffee.

In yet other aspects, the method includes shipping said packaged liquid coffee product and such that prior to shipping said packaged liquid coffee product has been subject to temperatures less than 100 deg Celsius while in the sealed container. In other aspects the method includes the step of chilling the coffee prior to the step of dissolving oxygen. In other aspects the chilling step includes holding at 33-38° F. for about 24 hours. In yet other aspects the step of dissolving oxygen occurs until the oxygen level reaches 18-36 ppm. In still other aspects said package coffee product contains a liquid portion with dissolved oxygen therein and a headspace portion with oxygen therein. In yet other aspects said container is a metal can. In still other aspects the container is a bottle. In still other aspects the method includes the step of heating the sealed container to at least about 145° F. for at least 3 minutes but heated to not more than about 190° F. In still other aspects the liquid coffee product maintains at least 1.25 ppm oxygen dissolved after 180 days of storage in room temperature conditions.

In other embodiments a packaged coffee product includes a sealed container with a liquid portion comprising coffee with oxygen dissolved therein. The product is free of *Clostridium botulinum* (*C. bot*) and the liquid portion further includes one or more of the group consisting of: milk, carbohydrate sweetener and artificial sweetener, to create the packaged coffee product wherein the packaged coffee product has a pH of 4.6 or greater wherein the liquid portion has 0.5-9 calories per ounce.

In other aspects the sealed container is packaged together with other sealed containers and has been heated prior to packaging to at least about 145° F. for at least 3 minutes but heated to not more than about 190° F. In yet other aspects the liquid portion has 2-7 calories per ounce. In still other aspects the liquid portion has 2-5 calories per ounce. In still other aspects the liquid portion contains 18-20 ppm oxygen at equilibrium. In other aspects after 180 days the oxygen level is at least 1.25 ppm. This could be in refrigerated storage or room temperature storage or anywhere in between. In yet other aspects the sealed container includes a headspace portion containing oxygen. In yet other aspects the sealed container with the packaged coffee product therein is not exposed to temperatures above 212 deg F. In still other aspects the sealed container with the packaged coffee product therein is not exposed to temperatures above 180 deg F. in still other aspects a plurality of the packaged coffee products are packaged together in a case, pack or pallet containing at least two of the packaged coffee products wherein prior to packaging in the case, pack or pallet, each of the packaged coffee products while in the sealed container is subjected to temperatures less than 200 deg F.

In certain aspects the calories per ounce ranges described herein are achieved without the use of artificial or no calorie sweeteners.

Other objects and the particular feature and advantages thereof will become apparent from the drawings, description and appended claims.

BRIEF DESCRIPTION OF THE DRAWINGS

FIGS. 4, 5, and 6 shows exemplary processing calculations for the amount of nitrogen or oxygen in the infused coffee products of FIGS. 1-3.

DETAILED DESCRIPTION OF THE INVENTION

Figure 1:
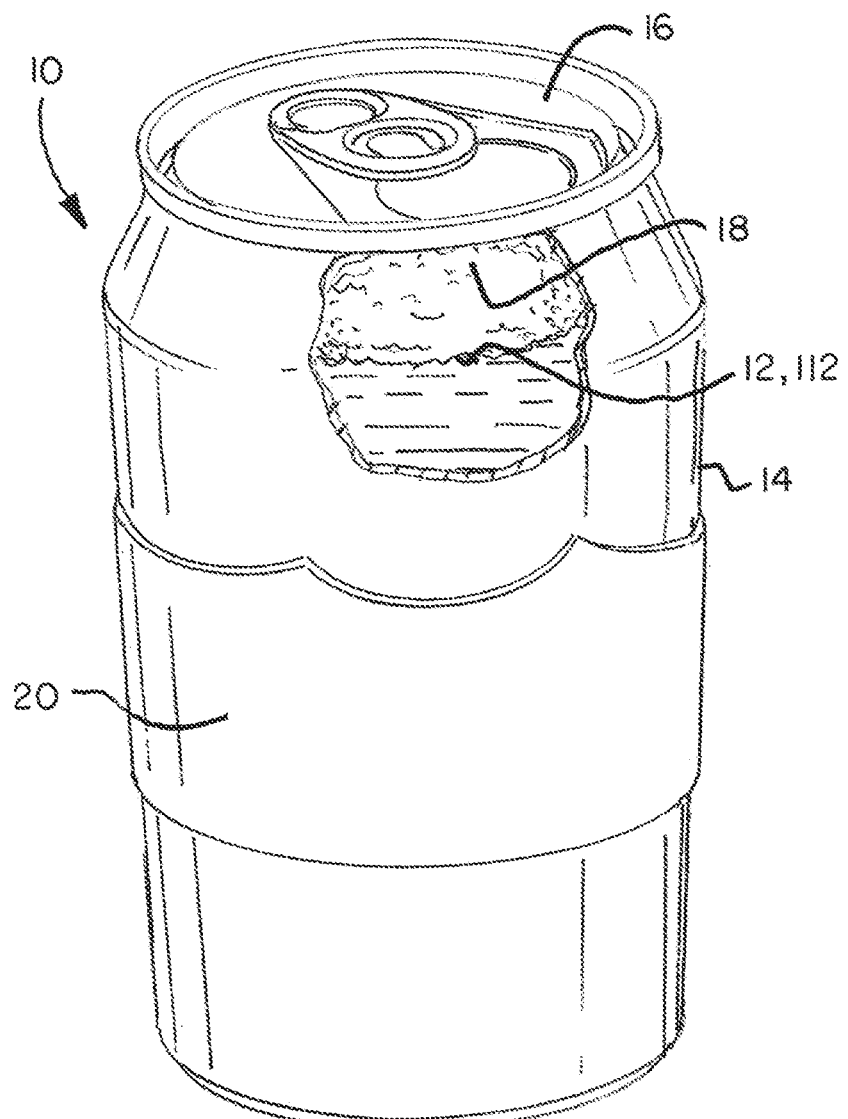
FIG. 1 is an illustration of a ready-to-drink infused coffee product disposed in a container that has shelf life greater than 10 days.
Figure 2A:
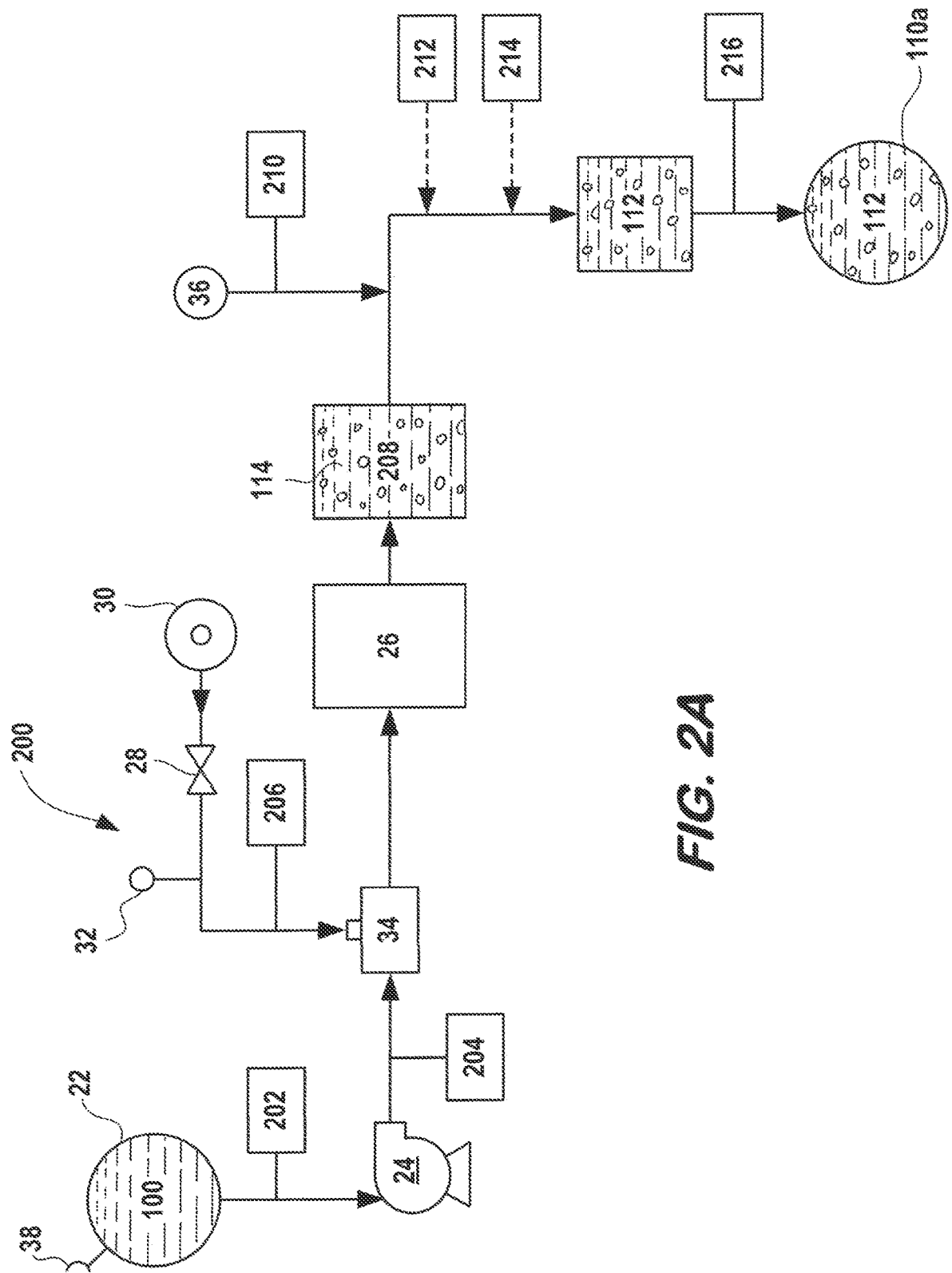
FIG. 2A is a functional flow diagram showing a method for processing an infused coffee product that inhibits *C. bot* growth.
Figure 3:
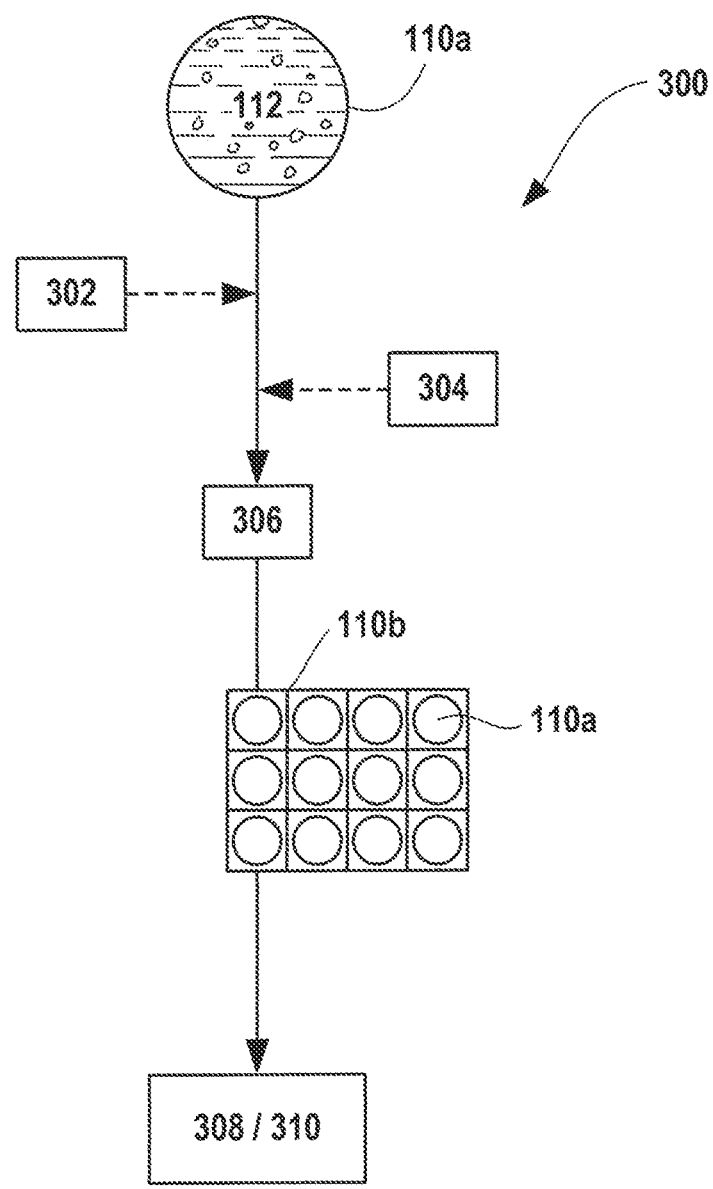
FIG. 3 is a functional flow diagram showing an alternative method for processing an infused coffee product that inhibits *C. bot* growth.

Referring to the Figures, wherein like reference numerals refer to like elements, a ready-to-drink coffee product system 10 is shown generally in FIG. 1. Methods of filling a coffee product having suitable shelf life 12, 112 into the systems 10, 110 are shown in FIGS. 2A and 3. The ready-to-drink coffee product systems 10, 110 may be useful for beverage applications requiring quality and convenience for a consumer. That is, the ready-to-drink coffee product system 10, 110 is shelf-stable, i.e., transportable and storable with refrigeration, for at least 90 days. More specifically, the ready-to-drink coffee product systems 10, 110 include a ready-to-drink coffee product 12, 112 that is flavorful, packaged for convenience, and storable and transportable for up to 153 days with refrigeration before consumption.

The inventive methods of filling are effective to produce a stable liquid coffee that has desired organoleptic qualities of taste, flavor, and acidity that remain relatively consistent throughout the product's shelf life. As a result, no matter when the coffee is consumed throughout its shelf life, it will have substantially consistent organoleptic characteristics from the day it is made and for up to 180 days or more after manufacture.

The coffee product 12, 112 is provided in a container 14, 114. The containers 14, 114 used in the present invention are not limited. For instance, PET bottle, cans made of aluminum, steel and the like, bottle made from paper, retort pouch, glass and the like. Packaging can also include packaging the liquid coffee product in a keg.

FIG. 1 depicts an aluminum can 14 but in other embodiments, a different type of container 114 may be employed, such as a bottle. The can may be a widget can. The term widget can includes cans containing a plastic insert attached to the bottom of the can, such as those commercially available from Ball Corporation. Alternatively, the widget may be a floating ball or flattened sphere type widget, such as those used in Guinness. The term widget is known in the brewing industry and generally includes small, hollow devices designed to release gas into a beverage upon the opening of a can or bottle. The widget is typically charged with nitrogen during a filling process and a pressure drop at the time of opening discharges the nitrogen into a can creating a unique mouth feel and head of foam. Alternatively, the widget could be filled with another inert gas instead of nitrogen. It is envisioned that non-can containers employed in the method may also contain such widgets.

In some embodiments, the containers 14, 114 are disposable. The disposable containers can be designed such that the beverage can be drunk directly from the container. In some embodiments, the container is heat-sealed with a metal-containing seal (e.g., an aluminum-containing lid) 16. In other embodiments, the container is sealed with a non-metal seal (e.g., a seal made from polypropylene, polycarbonate, polyethylene, polyethylene terephthalate, or the like, and combinations thereof).

In some embodiments, the container can hold a liquid volume of at least one fluid ounce. In preferred embodiments, the container can hold 6 to 25 fluid ounces, more preferably 7.5 to 22 ounces. In the most preferred embodiments, the container can hold 8 to 16 fluid ounces. It is also contemplated that the container could be a keg of standard keg sizes. Above the liquid 12, 112 the container has a headspace 18 in which no coffee is present. The coffee beverage 12, 112 will assume the shape of the container 14, 114 when the beverage is dispensed. Some consumers may wish to drink the beverage from their own glass or coffee mug rather than from the container in which it is packaged. Thus, the filled beverage can be transferred to the glass, mug or a cup.

As used herein, the headspace is defined as the non-liquid portion inside the container.

Representative materials from which the can 14 may be constructed are aluminum, steel, or tin-coated/plated steel. Aluminum is less costly than tin-plated steel but offers the same resistance to corrosion in addition to greater malleability, resulting in ease of manufacture. The can 14 may be constructed in any manner known in the art. The can may have a printed paper or plastic label 20 glued to the outside of the curved surface, indicating its contents. Some labels contain additional information, such as recipes, on the reverse side. Labels 20 are more often printed directly onto the metal before or after the metal sheet is formed into the individual cans.

The can 14 may be lined with a plastic coating containing bisphenol A (BPA).

Representative polymer materials from which the container 114 and/or its lid can be constructed include but are not limited to polypropylene (PP), polycarbonate (PC), low density polyethylene (LDPE), high density polyethylene (HDPE), polyethylene terephthalate (PET), and the like, and combinations thereof. In some embodiments, the choice of container can also be influenced by the oxygen transmission rate of the polymer material. Materials that provide better oxygen barrier properties can help to prevent the loss or reintroduction of oxygen into the liquid coffee solution. Although PET provides a better barrier to oxygen than polypropylene and, in some embodiments, can be used to make the container, PET has a relatively low softening point that can render it an unsatisfactory in some circumstances.

In some embodiments, at least some portion of the container 114 comprises a flexible wall. In some embodiments, the choice of material for the container can be extended to nonpolymer materials such as glass.

Methods of filling brewed coffee 100 into a container 114 to produce a stable infused coffee product 112 is shown generally in FIGS. 2-3.

The coffee 100 can be brewed in conventional or non-conventional manners. Typically, the coffee is brewed at 0 to 100° C.

The coffee 100 is preferably a cold brew coffee. Cold brew coffee refers to a coffee product that is filtered slowly (steeped) through cold, room temperature, or is brewed at a temperature less than 50° C., preferably less than 35° C., more preferably at or less than 25° C., water brewing process. Often times, the steeping will occur for 8 or more hours. In certain particularly preferred embodiments, the method utilizes a coffee brewed at 3-15° C.

As used herein, the term "room temperature" means ambient condition.

As used herein the term "ambient" refers to uncontrolled atmospheric conditions in the room or place. For purposes of experiments and manufacturing conducted by the inventors, ambient conditions aimed to achieve 18° C.±2° C./60% RH±5% RH. However, such conditions were not strictly maintained and monitored in the ambient environment.

Cold brew coffee is typically a low acid food. Per FDA, a "low-acid canned food (LACF) is any food (other than alcoholic beverages) with a finished equilibrium pH greater than 4.6 and a water activity greater than 0.85, excluding tomatoes and tomato products having a finished equilibrium pH less than 4.7." In contrast, an "acidified food (AF) is a low-acid food to which acid(s) or acid food(s) are added and which has a finished equilibrium pH of 4.6 or below and a water activity (aw) greater than 0.85." FDA requires that manufacturers of LACF register each establishment and file scheduled processes with the Food and Drug Administration for each product, product style, container size and type and processing method (21 CFR 108). The current GMPs pertaining to LACF are in the August 2017 Low-Acid Foods Packaged in Hermetically Sealed Containers (LACF) Regulation and the FDA Food Safety Modernization Act: Guidance for Industry, the contents of which is incorporated herein by reference.

Various methods of preparing coffee 100 are known. The present invention is suitable for filling NCB coffees, nitro coffees, or other infused coffee products into containers. In certain embodiments, the invention fills NCB coffee for which the brewing process does not exceed a temperature above 15° C. Preferably, the coffee 100 is steeped in cold, purified water for about 24 hours, more preferably 17 to 18 hours. In alternative embodiments, the coffee is steeped at ambient conditions for 17 to 24 hours, more preferably about 17 to 18 hours.

As used herein, the term "about" is defined as ±10%, preferably ±5%.

In some embodiments, the coffee is brewed to have about 96% to about 99% water and 1% to 4% total dissolved solids. In preferred embodiments, the coffee is brewed to have about 98% to about 98.6% water and about 2% to 1.4% total dissolved solids. In particularly preferred embodiments, the brewed coffee contains 1.4 to 1.8% total dissolved solids, most preferably, 1.4 to 1.6% total dissolved solids. The coffee can optionally be brewed concentrated and diluted at a later time.

The species of coffee beans used in the present invention are not limited in particular. Although *Arabica* species and *Robusta* species exist as coffee varieties, concretely, Brazil, Colombia, Kilimanjaro, Mocha and the like, which are *Arabica* species, are preferably used. In addition, these may be used alone, or may be used by suitably blending a plurality of species. In addition, Indonesia, Vietnam and the like, which are *Robusta* species, may also be used by blending or the like with the *Arabica* species.

Coffee material may be procured or sourced from any coffee-producing jurisdiction, such as, but not limited to, one or more of Brazil, Vietnam, Colombia, Indonesia, Ethiopia, India, Mexico, Guatemala, Peru, Honduras, Uganda, Ivory Coast, Costa Rica, El Salvador, Nicaragua, Papua New Guinea, Ecuador, Thailand, Tanzania, Dominican Republic, Kenya, Venezuela, Cameroon, Philippines, Democratic Republic of the Congo, Burundi, Madagascar, Haiti, Rwanda, Guinea, Cuba, Togo, Bolivia, Zambia, Angola, Central African Republic, Panama, Zimbabwe, United States, Nigeria, Ghana, Jamaica, Sri Lanka, Malawi, Paraguay, Sierra Leone, Australia, Trinidad and Tobago, Nepal, Republic of the Congo, Equatorial Guinea, Gabon, and Benin.

In some preferable embodiments, the coffee beans are sourced from Kenya, Ethiopia, Indonesia, Colombia, Guatemala, Costa Rica and/or Brazil. In some of those embodiments, the beans are Kenya AA Peabeary, Ethiopia Longberry Harrar, or Sumatra Mandheling. In some embodiments, the coffee beans are a mixture of beans sourced from Kenya, Ethiopia, Indonesia, Colombia, Guatemala, Costa Rica and/or Brazil. In some embodiments, beans from Antigua Guatemala are utilized.

It is preferred to use beans that result in coffee grounds that consistently hold the pH below 5.2.

When producing the coffee drinks of the present invention, it suffices to carry out grinding of the coffee beans for brew 100 by conventional methods, and it suffices to adjust suitably the degree of grinding according to the desired taste or the like.

When producing brew 100, it suffices to extract the roasted coffee beans and or grounds thereof according to conventional cold brewing methods with water, the water used not being limited in particular. For water used in the extraction and mixing, pure water, hard water, soft water and ion exchanged water, aqueous solutions containing ascorbic acid and pH-adjusted water or the like, can be given as examples; in addition, degassed water resulting from degassing of these waters for use can be used adequately. As mentioned, preferably, the coffee is steeped in cold, purified water.

It is preferable to use a roasting process that results in coffee grounds that consistently hold the pH below 5.2.

In order to produce stably the coffee drink packed in container in the present invention 10, 110, maintaining the liquid temperature during container filling to below 50° C., more preferably below 30° C., and most preferably to temperatures below 15° C., is preferred from the point of taste, flavor and preventing *Listeria* and *C. bot* growth. In certain preferred embodiments, the entire filling process is conducted at temperatures of 3-15° C. In other preferred embodiments, the filling process is conducted at chilled conditions. However, the invention is not meant to exclude brews 100 that are filled at temperatures above these ranges.

The coffee drink packed in container of the present invention 10, 110 may contain one or more flavoring agents, such as extracts, flavored syrups and concentrates. Such flavoring agents are well known and conventionally used in the coffee industry. These flavors can be natural or artificial in origin. Preferred flavors, or mixtures of flavor, include coconut, caramel, almond nut, amaretto, anisette, brandy, cappuccino, mint, cinnamon, cinnamon almond, Grand Mariner®, peppermint stick, pistachio, Sambuca, apple, chamomile, cinnamon spice, creme, crème de menthe, vanilla, French vanilla, Irish creme, Kahlua®, mint, peppermint, lemon, macadamia nut, orange, orange leaf, peach, strawberry, grape, raspberry, cherry, coffee, chocolate, cocoa, mocha and the like, and any mixtures thereof; as well as flavorant/aroma enhancers such as acetaldehyde, herbs, spices, as well as any mixtures thereof. Other flavorings/additives may include the addition of other food additives such as mushroom extract, turmeric, ginger, collagen, extracts of spirits such as whiskey, rum etc, CBD or hemp products or other food additives. It is understood that in preferred embodiments these additives would need to be pasteurized prior to being added to the coffee.

Flavored beverage products, especially flavored instant coffee products, typically comprise an edible water-soluble acid (organic or inorganic). Suitable acids include citric acid, malic acid, tartaric acid, fumaric acid, succinic acid, phosphoric acid, as well as mixtures of these acids. The invention does not require addition of acid, however, it is not mean to exclude beverages to which acid may be added.

The coffee drinks packed in container of the present invention 10, 110 may contain carbohydrates. As carbohydrates sweeteners such as, sucrose, glucose, fructose, xylose, fructose-glucose syrup and sugar alcohol, and cyclodextrins or the like may be cited. Among these, sweeteners such as sucrose and sugar alcohol are more preferable. In addition, these carbohydrates also include those derived from coffee bean extracts or the like.

The coffee drinks packed in container of the present invention 10, 110 may alternatively contain artificial sweeteners. Any artificial sweetener known to those of ordinary skill in the art may be used. Non-limiting examples of artificial sweeteners that may be used include saccharin, cyclamate, aspartame, acesulfame potassium, sucralose, mannitol, sorbitol, xylitol, stevia and peptide sweeteners.

From the point of view of the taste, the content in these carbohydrates or sweetener per drink packed in container is 0.01 to 30.00 percent in weight, more preferably 0.01 to 20.00 percent in weight, even more preferably 0.50 to 15.00 percent in weight, and particularly preferably 1.80 to 10.00 percent in weight. In preferred embodiments, the coffee product 10, 110 does not contain carbohydrates.

Optional ingredients in the beverage products of the present invention are processing aids, including flow aids, anti-caking agents, dispersing aids, and the like. Particularly preferred are flow aids such as silicon dioxide and silica aluminates. Starches, aside from the thickening agents, can also be included to keep the various ingredients from caking.

In addition, the coffee drink packed in container of the present invention 10, 110 may contain a milk component. As milk components, raw milk, sterilized milk, powdered whole milk, powdered nonfat milk, fresh cream, concentrated milk, nonfat milk, partially nonfat milk, condensed milk and the like may be utilized. In addition, as emulsifying agent, sucrose fatty acid esters, sorbitan fatty acid esters, polyglycerol fatty acid esters, fatty acid glycerides, lecithins may be used. Alternatively, plant-based milks may be used such as those produced from nuts, fruits, grains, and legumes. Common but non-limiting examples include soy, almond, hazelnut, coconut, cashew, rice, oat and hemp seed milks. In preferred embodiments, the coffee product 10, 110 does not contain a milk component.

The headspace gas composition of canned cold brew coffee is very important. Atmospheric gases such as carbon dioxide ($CO_2$), oxygen, or nitrogen can have varying impact on product stability. Fresh roasted coffee actively degases, giving off volumes of carbon dioxide ($CO_2$), carbon monoxide (CO), and volatile organic compounds (VOC). Oxygen exposure may also interact with the roasted coffee and contribute to product oxidation. An inert gas, such as nitrogen, flushed into the product headspace can help reduce the rate of oxidation.

In certain aspects, the present invention introduces oxygen at controlled levels into coffee 100 before or during the filling process in order to supply appropriate partial pressures of oxygen, which are enough to inhibit C. bot growth without reducing the shelf life in an unsatisfactory way.

Figure 2B:
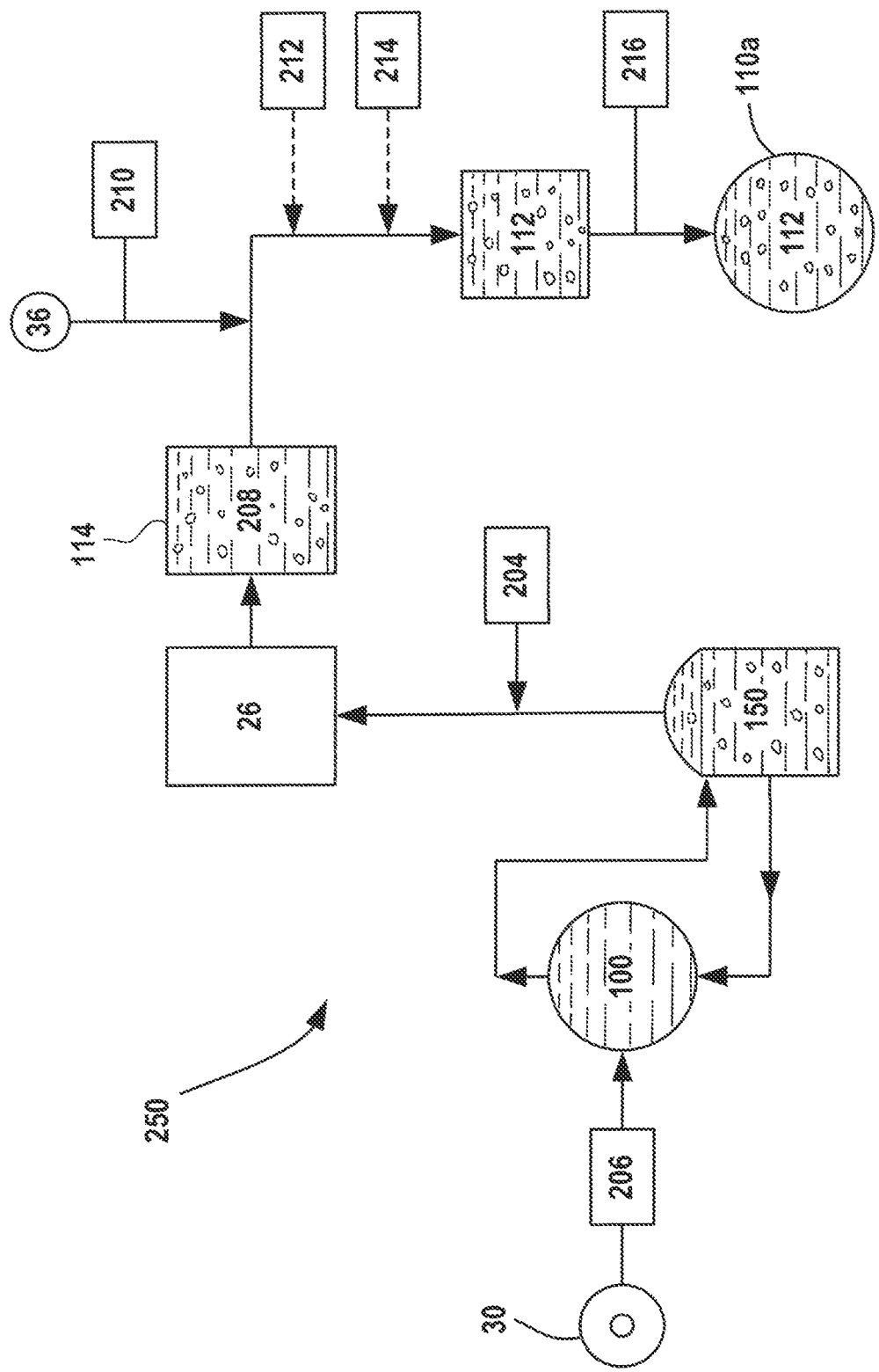
FIG. 2B is a functional flow diagram showing an alternative method for infusing a coffee product.

Particularly, as shown in FIGS. 2A and 2B, oxygen is introduced into the coffee 100 in an amount to keep the percentage of oxygen in the filled product at approximately 3-10% or, more particularly, approximately 3-6% with the remainder being substantially inert gas, e.g. nitrogen. The pH of the processed, filled coffee product 10, 110 remains at 4.6 or greater, preferably 5.0 or greater. This pH of 4.6 or greater can apply to the canned coffee product including added flavors such as sweeteners, milk etc. preferably the pH is 5.0 or greater, preferably 5.2 or greater or in the range of 5.2-6.0, more preferably in the 5.5-6.0 range, this may include added sweeteners/flavors/milk. In particular embodiments, oxygen amounts to 5% of the headspace to allow for oxygen to dissolve over time and still maintain a level of approximately 3% in the head space, which has been shown effective at inhibiting C. bot growth.

In some embodiments, the method further comprises substantially filling a headspace above a packaged beverage with an inert atmosphere, which, in some embodiments, comprises a gas selected from the group consisting of nitrogen, argon, helium, neon, sulfur hexafluoride, and combinations thereof. In some embodiments, the method further comprises sealing the container 14, 114 with a lid, such as lid 16 of FIG. 1.

Referring now to FIGS. 2A, 2B, and 3, methods 200, 250, and 300 for producing stable infused coffee beverage systems 10, 110 are shown. An exemplary filling method is a canning line that will fill product into can 14 of FIG. 1.

As shown in step 202 of FIG. 2A, a centrifugal pump 24 pulls coffee 100 from a storage tank 22 and feeds it into a canning line 26 at rate 204. In one example, a rate 204 of 2 gallons per minute is used. A container (cylinder) of oxygen 30 is connected to a valve 28 and pressure regulator 32, which delivers pressurized oxygen at a controlled rate 206 into a micro gas infuser 34.

An exemplary infusion rate 206 is 1 psi, but it should be understood that this is exemplary only. When referring to infusion rates in psi, it is meant to connote a net positive psi. That is, the coffee moving through the canning line at a certain gpm will exert a positive pressure (measured in psi) against the oxygen infuser line. The oxygen pressure must exceed the pressure of the coffee. For example, coffee moving at a rate of 2 gpm may exert a pressure of 10 psi. To achieve a positive net pressure on the coffee of 1 psi, the oxygen pressure would be set to 11 psi.

Generally, if the feeding rate 204 in gallons per minute is higher, a higher pressure 206 may be needed to infuse the same amount of oxygen. In addition, the ratio of 1 psi/2 gpm is merely one example and other ranges of both numbers can be used in order to deliver the desired mixture in the end product. In this example, a 1 psi and 2 gpm rate give approximately 3% oxygen in a headspace 18 of the canned product 10, 110a once canned. In certain embodiments, higher partial pressures of oxygen are used so that if the oxygen dissolves into the liquid over time in the can, the headspace 18 at the end of the shelf life remains approximately at 3% oxygen or higher. Being at approximately 3% oxygen in the head space 18 of the can 14 is indicated as a critical value for inhibiting C. bot growth in that lower partial pressures could increase the risk of growth. At the same time, a higher percentage of oxygen can both degrade the taste profile over time and give the possibility of aerobic bacteria growth, thus a typical maximum oxygen rage might be below 10% or below 7%.

By way of comparison, sea level oxygen is about 20.9% whereas 19000 feet has approximately 10% oxygen and the summit of Mt. Everest (about 29000 feet) has close to 7% oxygen. Thus, below 10% (or 7% or preferably 5%) is somewhat unlivable to aerobic organisms or at least not productive for significant growth.

Referring again to FIG. 2A, the infuser 34 as shown is an in-line infusion system, which allows for dispersion of gasses to allow for the gas to dissolve in the liquid. This is done by passing the gas past what is referred in the industry as a "stone", which may have an infusion size of 2 microns. However, other suitable "stone" sizes can be selected and may depend on the processing speeds and pressures used. In one aspect, a GW KENT Inline Micro-Oxygenation System is used.

It is also contemplated to infuse the brewed coffee 100 with oxygen in large tanks in a manner that avoids in-line infusion in the filling process. One example, shown in FIG. 2B, is infusing a full holding tank with oxygen and then placing that infused liquid in a feed tank 150 for a canning line. This may allow for faster feed rates 204 in the filling process, which may be limited in certain scenarios by the in-line infusion process. This has been fairly successful for the inventors at 10-20 psi with the infused coffee recirculating in holding tank 150. The infused coffee is then pulled out of the holding tank 150 and into cans 114 without an in line infuser. It is also understood that the holding tank may include a mixer which allows for the addition of milk, sweeteners and/or flavors to the coffee product which will be sealed in the container.

In certain preferred embodiments of this method, the coffee 100 is infused to reach an oxygen level in tank 150 prior to canning of 10-40 ppm, preferably 20-40 ppm, most preferably 33-35 ppm, in order to achieve a product having 3-10% headspace when canned. Typically black coffee, whether nitro cold brew or regular brew (without added sugars/flavors) will include 25-30 ppm oxygen in the tank prior to canning. After canning, the oxygen content tends to reduce some to about 22-28 ppm. With added sweeteners, milk or other flavors in coffee is typically at 35-40 ppm oxygen in the tank prior to canning with 28-36 ppm, this applies to cold or regular brew. Therefore, in some embodiments, coffee with flavors added is infused to higher oxygen levels. However, it is also contemplated that amounts over 45 ppm can be used and this may be applicable whether or not flavors are added to the coffee. In some of these embodiments, the infusion occurs at to 55-65° F. In addition to inhibiting C. bot growth, the infusion of oxygen preserves the flavor of coffee longer. Specifically, coffees with added sweeteners, specifically carbohydrate sweeteners tend to sour over a 180 day shelf life, but the added oxygen inhibits this souring of the sweetened coffee. This may be, for example, a result of the added oxygen inhibiting fermentation.

Testing of cans has showed that the oxygen levels remain at sufficient levels to inhibit/prevent botulism for at least 12 months, and given that the percentage of oxygen and ppm remain similar for 180-365 days. Thus indicating that the shelf life for both refrigerated and non-refrigerated cans can exceed 180 days shelf life or even exceed 365 days.

Therefore, the addition of oxygen is useful for both, non-refrigerated or shelf stable products in addition to being useful in refrigerated products. It is understood that the disclosure herein contemplates use of the various parameters disclosed for shelf stable and refrigerated coffee and beverages along with cold brews or more traditional hot brew (with or without added flavors, sweeteners or other additives). The addition of oxygen allows for high temperature (retort) processing to be avoided.

Figure 2C:
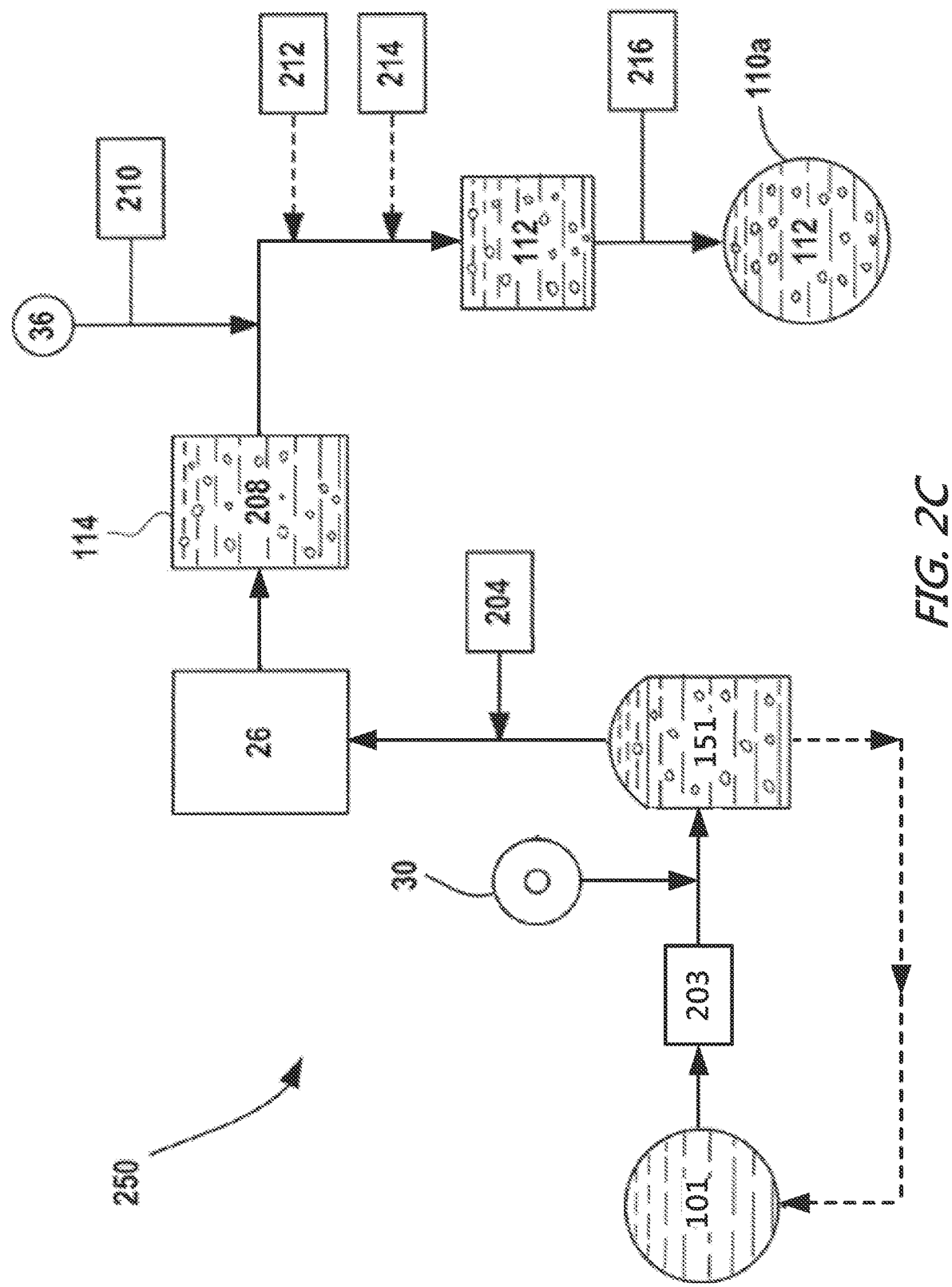
FIG. 2C is a functional flow diagram showing an alternative method for infusing a coffee product.

In other preferred embodiments, as shown in FIG. 2C, the coffee 101 is first chilled, then infused to reach an oxygen level in tank 151 prior to canning of 18-24 ppm, more preferably 20-22 ppm. The chilled conditions, e.g., 33-38° F., are maintained for about 1 day before canning. The tank may be placed in a refrigerated enclosure, or the tank may be jacketed and cooled water continuously circulated to maintain proper conditions. The chilled coffee 101 and infused coffee 151 may contain a mixer or may be continuously recirculated between the two tanks during the infusion process.

As shown in FIG. 2C, a container (cylinder) of oxygen 30 delivers pressurized oxygen to chilled coffee 101 in a feed tank 151 for a canning line. In step 203 the coffee 101 is stored at chilled conditions for up to about 1 day and infused about 30 minutes before canning. This may allow for faster feed rates 204 in the filling process. The chilled coffee is pulled into a holding tank 150 and into cans 114 without an in line infuser.

In certain embodiments, the infusion of oxygen occurs about 30 minutes before canning. In some preferred embodiments, the infusion occurs 30 minutes or less before canning.

In other embodiments, the coffee 101 may be infused at 55-65° F. and then quickly further chilled to reach an oxygen level in tank 151 prior to canning of 10-40 ppm, preferably 20-40 ppm, most preferably 18-22 ppm, in order to achieve a product having 3-10% headspace when canned.

As used herein, "chilled" or "chilling" means reducing the temperature, typically to refrigerated conditions. Those of skill in the art are aware of various ways in which to effectuate chilling and maintain chilled conditions.

As used herein, the term "refrigerated conditions" means a temperature of 40° F. or below.

In some embodiments, the infused coffee is held at 33-38° F. for about 22-26 hours, more preferably about 24 hours before canning.

It is also contemplated that this method can be used in combination with the in-line infusion method of FIG. 2A, whereby less oxygen is required to be added by any in-line infuser.

As shown in FIGS. 2A-2C, after the infusion is complete, the oxygenated liquid is fed into the canning line 26 which distributes pre-determined amounts of infused coffee 208 into open top containers 114 and then doses inert gas in step 210 via an inert gas dosing system 36. Potential inert gases nitrogen, argon, helium, neon, sulfur hexafluoride, and combinations thereof. Preferably, the inert gas comprises nitrogen. Most preferably, the inert gas consists of or essentially of nitrogen.

In some embodiments, the dosing process 210 is accomplished by bubbling an inert gas such as nitrogen through the beverage 208 in container 114. In some embodiments, in addition to the bubbling, the headspace is also filled with an inert gas. In some embodiments, the bubbling process can proceed for a time ranging from minutes to several hours depending on the volume of beverage being degassed, the bubbling rate, and the desired reduction in the concentration of dissolved oxygen. The degassing by bubbling can also be assisted with stirring 212 and/or with a vacuum 214 applied to the headspace above the beverage. As will be appreciated by the skilled artisan, any combination of dosing techniques—both the techniques described above as well as all manner of additional techniques—may be used to achieve a beverage solution 12, 112 of desired oxygen content without deviating from the present teachings. It is to be understood that the particular technique or techniques used in accordance with the present teachings is not restricted.

Dosing 210 the headspace of the filled containers 114 with liquid nitrogen pressurizes the container 114 and adds rigidity, which helps during packaging and handling. A precise drop of rapidly expanding liquid nitrogen into cold fill lightweight PET packages and aluminum cans allows for consistent pressure from package to package and also has the advantage that it eliminates paneling and palletizing problems. One commercial example of a system that enables nitrogen dosing is VBS NITRODOSE liquid nitrogen injection system. Various types of NITRODOSE systems are available for different requirements. It is also understood that dosing can be done with oxygen with or without the previously described dissolving/infusing inline or with in a holding tank in order to achieve the desired oxygen levels.

Once the nitrogen (e.g. liquid nitrogen) or other dosed product which is a gas at room temperature (e.g. Oxygen, Carbon Dioxide) is introduced into the container in step 210 and, optionally, steps 212, 214, a lid is placed on container 114 and sealed as shown in step 216 of FIGS. 2A and 3. The liquid nitrogen or dosed product will rapidly increase in temperature and become a gas, thus resulting in about 30-60 net psi inside a sealed can (about 2-4 atm). The amount of liquid nitrogen introduced as compared to oxygen is calibrated in order that the head space (i.e. non-liquid part inside the sealed can) is 3-10% oxygen or more particularly 3-6% or even more particularly 5% oxygen. However, it is understood that if, for example, a can is made with 5% oxygen and then sits on a retail shelf or in transport for some time (e.g. 30 days), some of the oxygen may dissolve, thus reducing the percentage of oxygen. Typically, oxygen will be present in the headspace in the 1-10% range, even more particularly in the 1-5% range. It is understood that the specific levels of oxygen are exemplary and the inventors contemplate levels of oxygen outside those specifically described both for inhibiting C. bot and for preserving flavor, especially with added milk/sugars etc.

In some embodiments, the lidding material 16 contains an aluminum film to help prevent oxygen penetration into the container after it is sealed. In some embodiments, such as in the can of FIG. 1, the lids 16 is applied to the disposable containers 14 filled with coffee beverage 12, 112 using standard hot stamping techniques and equipment available in the packaging industry. In other embodiments, the lidding material may also be oxygen permeable including PET or PP.

In some embodiments, the beverage 112 can be dispensed into individual disposable containers that are ultimately purchased by the consumer.

In some embodiments, as shown in FIG. 2A, the preparation system can also have a thermocouple or other temperature measuring device (such as infrared photodiodes or thermistors) 38 to measure the temperature of the preparation chamber to maintain the brewed coffee 100 at a constant temperature.

In some embodiments of the inventive method, as shown in FIG. 3, the packaged system 110a is sent in step 306 to a refrigeration system to cool the temperature of the beverage. Storage at temperatures less than 3° C. are generally recognized as being a means of preventing growth and toxin formation by non-proteolytic C. bot. Product produced according to the present invention was able to prevent growth and toxin formation by non-proteolytic C. bot when stored at less than 10° C. or below 40° F.

In addition, the method 300 may include the step 302 of coding or stamping the ready-to-drink coffee product system 110a with identification materials, coating the container portion of packaged product 110a with a label or sleeve, and a step 304 packing the ready-to-drink coffee product system 110a into a case, pack, and/or pallet 110b for transportation or storage. Further, the method 300 may include, 308 storing the ready-to-drink coffee product in uncased 110a or cased 110b container for up to one year, and, after storing, performing step 310 of testing the coffee product 112 contained within the containers 110a to produce a test result that indicates that the product is free from *Salmonella, Escherichia coli* O157:H7, *Listeria monocytogenes* and spores of non-proteolytic and proteolytic strains of *Clostridium botulinum*.

Product produced according to the inventive methods may additionally be pasteurized, for example be heating to 145° F. for at least 3 minutes by conventional means. Indeed, a pasteurization step may be necessary if carbohydrate or certain optional ingredients are added to the coffee. An advantage of the invention, however, is that pasteurization is not required to inhibit *C. bot* growth. That is, product made according to the inventive methods described herein and shown in the figures showed similar results to product that was additionally subjected to a pasteurization step before final packaging.

The infused coffee product 12, 112 may be free from a food additive selected from the group consisting of preservatives, e.g., sodium benzoate and potassium sorbate; sweeteners, e.g., cane sugar, saccharin, aspartame, and sucralose; flavorants, e.g., cocoa powder, cream, chicory, and milk; and acidulants, e.g., citric acid, malic acid, lemon juice, lemon juice concentrate, acetic acid, lactic acid, fumaric acid, tartaric acid, phosphoric acid, and succinic acid, even though the product 12, 112 may have a pH of greater than 4.6. The infused coffee product 12, 112 may be free of antioxidant, e.g. erythorbic acid, ascorbic acid and water-soluble salts. That is, the infused coffee product 12, 112 may be characterized as a low-acid coffee material and yet may be free from added antioxidants, preservatives, sweeteners, flavorants, acidulants, and added calories.

In some embodiments, the shelf life of the infused coffee 112 within package 110at in accordance with the method of FIG. 3 is 113 days of refrigerated storage or 122 days of refrigerated storage. In certain embodiments, the shelf life of a coffee product according to the invention is 153 days of refrigerated storage. In the most preferred embodiments, the shelf life of the coffee product is 180 days or at least 180 days.

A product's "shelf life" generally means the length of time you can expect a product to look and act as expected and to stay safe for use. For purposes herein, during the shelf life a product, it will not show signs of spoilage and will be free of *C. bot*.

It is envisioned that the methods described herein can be performed in a modern food packaging facility in which the necessary equipment to brew a coffee-based beverage, infuse and dose the beverage, dispense the beverage into disposable containers, seal the containers under an inert atmosphere, and optionally refrigerate the product are available such that the entire process can be performed rapidly and efficiently. In some embodiments, the completed coffee product 10, 110a, or 110b is shipped to retail stores, purchased by a consumer as a room temperature or refrigerated beverage in a disposable container, and stored at home or work maintained at ambient or cooler conditions.

In certain embodiments, the shelf life of a coffee product according the invention will have a shelf life of 30 days, 60 days, 90 days, preferably 120 days, 180 days, 270 days or 365 days, depending on storage conditions. In certain preferred embodiments, the product exhibits shelf life of 30 days, 60 days, 90 days, 120 days, 180 days, 270 days and 365 days upon storage at refrigerated conditions.

In other embodiments, the shelf life of a coffee product according the invention will have a shelf life of 1 month, 2 months, 3 months, 4 months, 5 months, 6 months, 7 months, 8 months, 9 months, 10 months, 11 months, or 12 months. In certain preferred embodiments, the product exhibits shelf life of 3 months, 4 months, 5 months, 6 months, 7 months, 8 months, 9 months, 10 months, 11 months, or 12 months upon storage at refrigerated conditions.

In particularly preferred embodiments, the shelf life of a coffee product according to the invention is 180 days or at least 180 days.

Research has indicated that the expiration date should be determined based upon the expected amount of time it will take for the oxygen to reduce to about 3%, as this is the point where *C. bot* growth becomes a higher risk. Therefore, the filling line may also be adjusted to print an expiration date based on the expected time when 3% oxygen will be reached.

In some embodiments, initial testing showed at least 90 days, or at least 180 days of shelf life protected from *C. bot* growth when the product was refrigerated. That is, coffee produced according to the invention is shelf stable for greater than 90 days, or 180 days.

In certain embodiments, the shelf life of a coffee product according to the invention stored at <10° C. is 113 days.

In certain embodiments, the shelf life of a coffee product according to the invention stored at <10° C. is 122 days.

In some embodiments, the shelf life of a coffee product according to the invention stored at <10° C. is 126 days.

In certain embodiments, the shelf life of a coffee product according to the invention stored at <10° C. is 153 days.

In certain embodiments, the shelf life of a coffee product according to the invention stored at <10° C. is 180 days.

In some embodiments, coffee product according to the invention is shelf stable for 180 days or more.

FIG. 4 shows one exemplary solution for solving the pressure of oxygen using Henry's law and associated constants and formulas. Since the remaining head space within a can (i.e. above the liquid) is nitrogen due to the dosing process, the partial pressure of oxygen can be determined assuming different atmospheres of pressure. Meaning, if more nitrogen is added during the filling process, a higher partial pressure of nitrogen will result as will a higher overall pressure.

FIG. 5 shows nitrogen dosing calculations. The nitrogen dosing is performed once the oxygenated coffee product has been placed in the can and prior to sealing/fitting the lid. A pre-set amount of nitrogen is added (liquid nitrogen for example) to the can and the lid is quickly put on and sealed. Thus, FIG. 5 shows calculations for the Mols of nitrogen to achieve 5% Oxygen and 95% nitrogen amounts in different pressure scenarios.

As a general guideline, cold brew nitro coffee cans once finished generally have a net positive pressure of about 30-45 psi, which is about 2-3 atmospheres (at canning temperature). Generally, canning temperatures are in the 3-8° C. range.

FIG. 6 shows different exemplary calculations for determining the pressure of nitrogen in the infuser 34 of FIG. 2 necessary to achieve the desired headspace 18 of the can of FIG. 1. FIG. 6 shows 3% and 5% oxygen.

Referring back to FIGS. 1-3, the infused ready-to-drink coffee 12, 112 within product systems 10, 110a, 110b may be characterized as free from *Salmonella, Escherichia coli* O157:H7, *Listeria monocytogenes* and spores of non-proteolytic and proteolytic strains of *Clostridium botulinum* for at least 90 days. Further, the infused ready-to-drink coffee 12, 112 within product systems 10, 110a, 110b may be free from a food additive selected from the group consisting of antioxidants, preservatives, e.g., sodium benzoate and potassium sorbate; sweeteners, e.g., cane sugar, saccharin, aspartame, and sucralose; flavorants, e.g., cocoa powder, cream, chicory, and milk; and acidulants, e.g., citric acid, malic acid, lemon juice, lemon juice concentrate, acetic acid, lactic acid, fumaric acid, tartaric acid, phosphoric acid, and succinic acid, even though the infused coffee product 12, 112 has a pH of greater than 4.6, and typically greater than 5.0. That is, the packaged, infused coffee product 12, 112 may be characterized as a low-acid coffee material and yet may be free from added antioxidants, preservatives, sweeteners, flavorants, acidulants, and added calories.

The infused coffee product systems 10, 110a, 110b produced by the methods herein are economical to produce, transport, and store since the methods 200, 250, 300 do not require heating or aseptic processing during production, and do not require additional ingredients other than coffee and water.

The following examples illustrate the disclosed technology and are not to be viewed in any way as limiting to the scope of the disclosure.

EXAMPLES

Example 1. Preparation of Cold Brew Nitro Coffee Product

| Product | Kings Brew Nitrogen Infused Cold Brew Coffee |
|---|---|
| Process | O$_2$/N infused Cold Brewed Coffee |
| Max Eq. pH | 5.2 |
| Min Hold Time | 3 minutes |
| Min Fill Temp | 145° F. |

Ingredients:

| Ingredient | Measure | Unit | Weight % |
|---|---|---|---|
| Water | 98 | Ounces | 98.00 |
| Coffee Grounds | 2.00 | Ounces | 2.00 |
| Total | | | 100.00 |

Note:
use coffee grounds that consistently hold the pH below 5.2

Procedure:
1. Combine ingredients, cover and steep for up to 24 hours at less than 41° F.;
2. Infuse the cold brew with pure oxygen at 1% psi in the line filling the containers;
3. Place oxygen infused cold brew into clean containers, add liquid nitrogen, and seal immediately;
4. Test containers periodically during the canning process for dissolved oxygen content and pH to assure consistency in production.

Example 2: Initial Analysis of Example 1

The product was tested for redox potential and determined to be +212.4 mV. Further microbial analysis of the product also determined that the product showed no outgrowth of mesophilic spore formers. Additionally, testing for aerobic plate count (APC), lactic acid bacteria (LAB) and yeast and mold (Y&M) found very limited microbial activity with 20 cfu/g APC, 10 cfu/g LAB and 10 cfu/g mold found.

Exemplary Results, Batch No. 171103-018

| Test Description | Method Reference | Units | Result |
|---|---|---|---|
| Aerobic Plate Count- 3M | NF Validation Cert #3M 01/1-09/89 | CFU per gram or ml | 20 |
| Lactic Acid Bacteria | ISO 15214 | CFU per gram or ml | 10 |
| Mesophilic Aerobic sporeformers | APHA Compendium | per 10 grams | <10 |
| pH | | | 5.11 |
| Presumptive Sulphite Reducing Clostridia | ISO-15213:2003en | CFU per gram or ml | <10 |
| Coliforms - 3M | AOAC 991.14 | CFU per gram or ml | <10 |
| Rapid Yeast & Mold - 3M | AOAC RO Cert #121301 | CF | <10 10 |

Exemplary Results, Batch No. 117030-013

| Test Description | Method Reference | Units | Result |
|---|---|---|---|
| Dissolved Oxygen Saturation | HACH Meter | % | 27.2 |
| Dissolved Oxygen Saturation | | ppm | 2.34 |
| Redox Potential | | | 212.4 |
| pH | | | 5.03 |

Example 3: Preparation of Cold Brew Nitro Coffee Product

| Product | Kings Brew Nitrogen Infused Cold Brew Coffee |
|---|---|
| Process | O$_2$/N infused Cold Brewed Coffee |
| Max Eq. pH | 5.2 |
| Min Hold Time | 3 minutes |
| Min Fill Temp | 145° F. |

Ingredients:

| Ingredient | Measure | Unit | Weight % |
|---|---|---|---|
| Water | 98 | Ounces | 98.00 |
| Coffee Grounds | 2.00 | Ounces | 2.00 |
| Total | | | 100.00 |

Note:
use coffee grounds that consistently hold the pH below 5.2

Procedure:
1. Combine ingredients, cover and steep for 17 to 24 hours at ambient conditions;
2. Optionally, chill coffee at 33-38° F.;
3. Infuse the cold brew with pure oxygen to 20-35 ppm;
4. Place oxygen infused cold brew into clean containers, add liquid nitrogen, and seal immediately;
5. Refrigerate, and keep refrigerated at 33-38° F.;
6. Test containers periodically during the canning process for dissolved oxygen content and pH to assure consistency in production.

Example 4: Pasteurization of Samples

Product made according to Examples 1 and 3 was heated in the containers to greater than or equal to 145° F. and held for at least 3 minutes. Samples were stored at refrigerated conditions (<10° C.) and testing was performed at various time points.

No outgrowth of mesophilic spore formers or sulphite reducing Clostridia was found in samples tested prior to and after the 145° F. for 3-minute heating that was conducted as part of the process. Additionally, testing for aerobic plate count (APC), lactic acid bacteria (LAB) and yeast and mold (Y&M) found elimination and no growth was observed for all tests conducted. See KIN 171103-018.

Initial Analysis of Example 1, Batch No. 171103-018 after Pasteurization

| Test Description | Method Reference | Units | Result |
| --- | --- | --- | --- |
| Aerobic Plate Count- 3M | NF Validation Cert #3M 01/1-09/89 | CFU per gram or ml | 10 |
| Lactic Acid Bacteria | ISO 15214 | CFU per gram or ml | 10 |
| Mesophilic Aerobic sporeformers | APHA Compendium | per 10 grams | <10 |
| pH | | | 5.04 |
| Presumptive Sulphite Reducing Clostridia | ISO-15213:2003en | CFU per gram or ml | <10 |
| Coliforms - 3M | AOAC 991.14 | CFU per gram or ml | <10 |
| Rapid Yeast & Mold - 3M | AOAC RO Cert #121301 | CF | <10 <10 |

Example 5: Shelf Life Study

Product produced by the procedure of Examples 1, 3 and 4 was subjected to a shelf life study by a certified Process Authority. Products were tested by a laboratory accredited in accordance with the recognized International Standard ISO/IEC 17025:2005. This accreditation demonstrates technical competence for a defined scope and the operation of a laboratory quality management system (refer to the joint ISO-ILAC-IAF Communique' dated January 2009). The following tests were run.

| Test Description | Method Reference | Units |
| --- | --- | --- |
| Aerobic Plate Count- 3M | NF Validation Cert #3M 01/1-09/89 | CFU per gram or ml |
| *Bacillus* spp | APHA Compendium | CFU per gram or ml |
| Dissolved Oxygen Saturation | HACH Meter | % |
| Dissolved Oxygen Saturation | HACH Meter | ppm |
| Redox Potential | HACH Meter | |
| Heterofermentative Lactics | APP ENV MICR 53:1382 | CFU per gram or ml |
| Organoleptic Evaluation | Taste Panel | |
| pH | | |
| Pres Sulphite Reducing Clostridia-No Heat Shock | ISO-15213:2003en | CFU per gram |
| Rapid Yeast & Mold- 3M | AOAC RO Cert #121301 | CFU per gram or ml |

Results indicate that the ready-to-drink coffee product of Examples 1 and 3 does not support *C. botulinum* growth or toxin production throughout 180 days at refrigerated storage, is food safe and of excellent microbial and sensory quality.

In addition, the ready-to-drink coffee product of Examples 1, 3 and 4 remains microbiologically stable throughout 180 days of refrigerated storage. The product exhibited very low to no growth of potential spoilage organisms and no potential pathogenic organisms or toxins were detected throughout the test study. The product also met key criteria required to prevent outgrowth of *Clostridium botulinum* through 180 days.

Applicant is able to maintain flavor profile for up to 12 months whereby the liquid coffee has desired organoleptic qualities of taste, flavor, and acidity that remain relatively consistent.

Current reference data and research does not point to any direct scientific correlations that are resulting in the added shelf life for Kings Row Cold Brew coffee currently. It is also counter intuitive for the addition of oxygen to create longer shelf life when oxygen is well known to detract from the longevity through oxidation and enzymatic activity stimulation but none the less Kings Row product is doubling the shelf life that product retains high quality that other manufacturers have achieved, and the only differences of note are the oxygen addition and the coffee bean selection used.

Notably, comparative batches of kegs in which nitrogen but not oxygen was added to a particular coffee brew go sour after 90 days. Applicant's commercial competitors are not able to get past 90 days shelf life, and coffee brews that have 180 days shelf life must be pasteurized at typical conditions (e.g., 160° F. for 5 minutes), which negatively affects the flavor profile and organoleptic qualities of cold brews.

Oxygen dissolved in the coffee product unexpectedly provides better flavor profiles or more consistent flavor profiles over the shelf life of the product. Particularly, the packaged coffee industry and more generally the packaged beverage industry has believed that the addition of oxygen to the container or the failure to remove oxygen from the container would result in degradation of the flavors due to oxidation. As a result, many have actively tried to remove oxygen from the system. Applicant's testing has shown the addition of Oxygen to actually make the flavor profile more consistent and to preserve the flavor of coffee longer than without the added oxygen. Furthermore, many packaged beverages are treated using processing referred in the industry as "retort". "retort" is generally a higher level of heating as compared to pasteurization. For example, "retort" will often be in the range of 225 deg F. or more, often at or above 245 deg F. Retort is often used in non-cold chain beverages because the risk of *C. bot* is higher. Retort is generally used in products with pH levels of 4.0-7.0 that do not have preservatives and which may have a high risk for pathogens. Generally in coffee, retort is used for the prevention of *C. bot* and is used to achieve shelf stability of ready-to-drink coffee products with milk and sweeteners, particularly carbohydrate sweeteners which are also suitable for non-cold chain transportation and storage. Typical temperature ranges for retort are about 245 F/118 C-255 F/124 C. As previously mentioned, added milk products would often need to be high temperature pasteurized in order to kill *bacillus* bacteria prior to the addition thereof in the coffee.

By use of Oxygen, retort can be avoided in coffee, specifically coffee with added milk/sweeteners/flavors. Instead, gentler pasteurization can be used at temperatures at or below the typical brewing temperature for hot coffee. More particularly temperatures of 175 F or more particularly 165 F or less are desirable to make the milk/sugars etc. safe from pathogens other than *C. bot*. The added oxygen as described herein protects from *C. bot*. By eliminating retort the flavor of the coffee is preserved and therefore requires fewer ingredients and additives to cover up the flavor damage from high heat. Thus, by keeping the temperature at or below 175 F or more preferably at or below 165 F during pasteurization and while at the same time employing the use of oxygen, fewer calories are needed to create a product which maintains its flavor profile and also has a desirable taste. Specifically, a significant number of calories from sugars/carbohydrates/milk or other additives necessary to overcome/mask the flavor damage caused by high temperature treatment (e.g. retort), is no longer needed and thus the flavoring/sweetening additives are only necessary to the extent to create the desired flavor profile. As a result, the calories per serving go down substantially as compared to other similar products subjected to higher temperatures. The oxygen also assists in the improved flavor profile, which was an unexpected result. Therefore, since the flavor of the coffee is not damaged by retort, the product would require fewer calories, particularly sugars, to achieve suitable flavor profile as the retort processed ready-to-drink coffee product. Most preferably, the flavor profile is preserved without the addition of chemical or non-natural preservatives.

An evaluation of oxygenated and non-oxygenated products was done to compare flavor profiles. Product samples were evaluated on several sensory profiles to determine whether or not there was a discernable difference between oxygenated and non-oxygenated products. The test panel was composed of three trained members with randomly assigned, blindly labelled samples. Fresh apple slices and pure drinking water were used between sample tasting to cleanse the palette. Collaboration was not allowed during the testing and all members were adequately separated. Samples tested included Black coffee with Oxygen and without, Black coffee with Sugar with Oxygen and without, Black coffee with Sugar and Milk, both with and without oxygen. The following Data Table of Chemistry Results summarizes the products tested for flavor after sitting open at room temperature for two hours:

| | Equilibrium pH | Dissolved Oxygen |
|---|---|---|
| BLK + O2 | 4.71 | 1.96 ppm |
| | 4.75 | 1.84 ppm |
| BLK, NO O2 | 4.98 | N/A |
| | 4.96 | N/A |
| BLK + SUG + O2 | 4.75 | 1.73 ppm |
| | 4.73 | 1.79 ppm |
| BLK + SUG, NO O2 | 4.79 | N/A |
| | 4.81 | N/A |
| BLK + SUG + MLK + O2 | 5.29 | 1.93 ppm |
| | 5.28 | 1.95 ppm |
| BLK + SUG + MLK, NO O2 | 5.37 | N/A |
| | 5.39 | N/A |

Black with sugar included 0.5 gram sugar per ounce of coffee which is about 2 calories per ounce.

Black with sugar and milk—0.5 grams sugar per ounce of coffee/milk and the ratio of milk to coffee was 1:3 (i.e. ¼ milk ¾ coffee) with total carbohydrates/ounce—0.75 g/ounce. With this milk to coffee ratio, the calories per ounce from milk is about 3 calories per ounce (1% milk), about 2.5 calories per ounce (skim milk), about 3.5 calories per ounce (2% milk) and about 4.25 calories per ounce (whole milk). This would be in addition to the about 2 calories per ounce from sugar as described. Therefore, whole milk and sugar still is well below about 10 calories per ounce, more particularly below about 7 calories per ounce and with the skim variant being about 4.5 calories per ounce or less. This means that a 12 ounce cold brew can with sugar and skim milk is right about at 54 calories per ounce, particularly less than 75 calories, more particularly less than 70 and even more particularly less than about 65 calories. As a comparison, a 12 ounce can of Coca-Cola classic comes in at about 140 calories. The whole+coffee+sugar example here has less than about 90 calories per can, more particularly less than about 85 and even more particularly less than about 80 calories per can about 75 calories per ounce a generous portion of milk added and a smaller amount could be added to bring the calories per ounce below 30 calories for a 12 ounce can (e.g. the amount of milk added is half or less as compared to the tested sample). Other commercial coffee products generally have higher calories per ounce in canned coffees with milk and sugar added, for example greater than 10 calories per ounce and such products often include reduced fat milk whereas the present invention can utilize whole milk and still achieve 10 calories per ounce or less with substantial shelf life parameters as described herein. In order to give the perception of a lower caloric count, these beverages will often reduce the portion size to around 10 ounces or less.

As a result of the use of oxygen and avoidance of high temperature retort processing, the safety processing of the cans now does not destroy the delicate flavors of the coffee whereas retort or high temperature processing can destroy those flavors and cause the coffee to sour or not taste as pleasant. As described previously, other commercial products will employ more sugar and milk and other additives to their coffees in order to offset this damage caused by retort processing. Thus by packing and processing the coffee such that when ready to ship the coffee has been subjected to post brew processing temperatures below the boiling point of water, a beverage with a lower calorie count can be achieved while still guarding against both the *E. coli* and similar bacteria killed at lower temperatures and protect against *C. bot* (by use of oxygen). This combination of oxygen, coffee, milk and sugar (or other fat/carbohydrate additives) departs particularly from the general way of thinking as to how to treat canned coffee. Particularly, the general perception in the industry has been that use of oxygen when combined with e.g. milk and/or sugar will promote bacteria growth and that oxygen should be avoided. Thus the affirmative addition of oxygen, elimination of retort and the use of caloric additives such as milk, sugar and/or others described herein departs from the normal industry practices but has been found to provide a shelf stable beverage that maintains its pleasant flavor profile better than those without oxygen.

Each sample was dosed with nitrogen. The PPM oxygen numbers in the table are measured at 203 days with the range at canning in the 25-30 PPM oxygen range. Generally, it is beneficial if the PPM oxygen is about 1.25 or more or more preferably 1.5 or more after 180 days. The samples provide levels of oxygen high enough to inhibit *C. bot* growth even as the cans aged while also allowing for preserved and flavor profile. Each of the cans was pasteurized for three (3) minutes at 165 F which is considered by some to be the standard level of heat and time required to kill *listeria, salmonella* and *E. coli*. Retort processing at much higher temperatures is often used in products with longer shelf life to guard against *C. bot* growth, but in preferred embodiments, retort processing is not used.

In the testing, all panel members suggested they would reject the versions without added oxygen and all preferred the coffee with added oxygen over non-oxygenated coffee and the non-oxygenated versions tended to be less desirable.

"Cold-chain" refers to the storage and transport of beverages in chilled conditions as opposed to non-cold chain beverages which are transported in ambient conditions, e.g. in trucks without refrigeration units. When retort is used in coffee products, the coffee flavors will be negatively impacted and may turn sour. As a result, packaged coffee products which are non-cold chain will often need to have substantial added flavors/sweeteners to counteract the damage caused by retort. Pasteurization at lower temperatures below 212 deg F., more particularly in the 150-190 deg F. range has limited negative impact on the flavor of coffee (whether hot or cold brew coffee). Since the industry has generally believed that the addition of Oxygen would degrade the flavors, dissolving oxygen in the beverage to be packaged has not been seen as a viable manner to inhibit C. bot growth. Instead, the industry has accepted the flavor degradation associated with retort and addressed this by adding more flavor/sweetener such as milk and/or sugar. The result is a higher caloric content per ounce than would be needed if retort could be avoided.

Accordingly, in certain embodiments, the coffee product has oxygen dissolved therein and is mixed with milk, flavorings and/or sweeteners, but is not subject to retort processing temperatures while in the can. It is understood that elevated brew temperatures may be employed, e.g. boiling water to brew the coffee or that cold brew coffee could be utilized. However, retort processing would generally involve heating the sealed can/package/container with the beverage in the container.

The addition of oxygen inhibits growth of C. bot and the milk/sweeteners provide enough flavor for the product to be enjoyable, but at the same time the calories per ounce remain lower than typical packaged liquid coffee products. Thus, by combination of these features together, particularly oxygen, pasteurization without retort and caloric additives at a lower level, the caloric content can be reduced to, for example, 9 calories per ounce or less, 8 calories per ounce or less, more preferably 7 calories per ounce or less and even more preferably 6 or even 5 calories per ounce or less. In each of these examples, it is contemplated that there will be some caloric content, preferably of at least 0.5 calories per ounce, at least 1 calorie per ounce or at least 2 calories per ounce or at least 3 calories per ounce. Any combination of these lower and upper limits are contemplated ranges as well as narrower ranges within these limits, depending on the desired product characteristics.

Pasteurization can be used such that the packaged product is subject to the lower level temperatures described herein, e.g. 145 deg F., 150 deg F., 160 or 165 deg F. Retort generally involves temperatures such as above 220 deg F., more particularly in the 230-275 deg F. range, often employing super-heated steam and/or pressure to achieve those temperatures. In preferred embodiments this type of "retort" processing is avoided such that once packaged and shipped, the sealed can with the beverage has not been treated with retort temperatures.

The product can be cold chain transported/stored but may also be non-cold chain in that it is transported and/or stored without refrigeration. It is understood that a non-cold chain beverage according to the present disclosure may or may not be refrigerated at the point of sale. It is further understood that these treatments including oxygenation can apply to other low acid beverages such as teas, juices and the like where the use of oxygen can enable processing and packaging without retort and thus require less added calories. In the example of a juice, the added calories can remain less than e.g. 3 calories from sugar added. Coffee generally starts off as a zero calorie beverage, thus while the calories per ounce in the other low acid beverages might be higher, the added calories per ounce generally equates or is on the lower range of that which is described for coffee. Some examples of low acid beverages which already have caloric content include vegetable juices. However, by use of oxygen and avoidance of retort, the amount of added sugar is lower since it is no longer necessary to overcome the flavor destruction actually caused by retort. In addition, it is contemplated that the calories per ounce ranges described herein can be achieved without the use of artificial or no/low calorie sweeteners like stevia and the like or less than 0.5 grams dissolved per liquid ounce, or less than 0.35 grams, less than 0.25 grams, less than 0.2 grams or less than 0.1 grams or less than 0.05 grams or less than 0.025 grams, or less than 0.01 grams of these no/low calorie sweeteners, examples of which are disclosed herein.

The oxygen may be added by infusion or bubbling in of oxygen in line after brewing and/or after mixing with milk/sweeteners. Alternately, oxygen may be dosed into the container shortly before sealing in a similar manner to as nitrogen dosing has been described herein. Other gases may be infused/bubbled and/or dosed in as well in liquid form. Nitrogen and gasses other than oxygen may also not be used or used in limited quantities not to provide bubbling but more to evacuate air from the container prior to sealing.

It should be noted that, while various functions and methods have been described and presented in a sequence of steps, the sequence has been provided merely as an illustration of one advantageous embodiment, and that it may not be necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein. It is also specifically contemplated that the addition of oxygen and the other parameters described herein are applicable to coffee of all types whether cold or regular brews, with/without nitrogen or other gasses, with/without flavors, sugars, sweeteners, etc, and whether shelf stable or cold chain (refrigerated) products are produced and regardless of what post caning heat treatment is done, e.g. retort or lower temperature pasteurization.

It is further understood that the pressure in the can will impact the ppm reading of oxygen in the beverage and will also change the minimum ppm to reach the percentage O2 in the headspace as described herein. The oxygen dissolved and in the headspace will reach equilibrium depending on pressure, temperature and the other gases used/present. Normally cans are designed to be pressurized at least slightly above one atmosphere so that the can remains firm, but higher pressures can be used, depending on what is desired with the beverage.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of manufacturing shelf stable packaged coffee comprising:
   dissolving oxygen into a liquid coffee product; and
   packaging said liquid coffee product with oxygen dissolved therein into a sealed container along with one or more of the group consisting of: milk, flavor additives, carbohydrate sweetener and artificial sweetener, to create a packaged coffee product wherein the packaged coffee product has a pH of 4.6 or greater and the packaged coffee product has a caloric content of 0.5-9 calories per ounce; and shipping said packaged liquid coffee product and such that after packaging and prior to shipping said packaged liquid coffee product has been only subject to temperatures less than 100 deg Celsius while in the sealed container and not subject to temperatures above 100 deg Celsius while in the sealed container such that said packaged liquid coffee product is not subject to retort processing.

2. The method of claim 1 wherein the carbohydrate sweetener is selected from the group consisting of sucrose, glucose, fructose, xylose, fructose-glucose syrup sugar alcohol, cyclodextrins and combinations thereof.

3. The method of claim 1 wherein the artificial sweetener is selected from the group consisting of saccharin, cyclamate, aspartame, acesulfame potassium, sucralose, mannitol, sorbitol, xylitol, stevia, peptide sweeteners and combinations thereof.

4. The method of claim 1 wherein the milk is selected from the group consisting of: raw milk, sterilized milk, powdered whole milk, powdered nonfat milk, fresh cream, concentrated milk, nonfat milk, partially nonfat milk, condensed milk, plant-based milk and combinations thereof.

5. The method of claim 1 wherein the packaged coffee product includes milk and carbohydrate sweetener and excludes artificial and no/low calorie sweeteners of more than 0.1 gram per ounce liquid.

6. The method of claim 5 wherein the dissolving step includes infusing the oxygen inline into the liquid coffee product while said liquid coffee product flows through a packaging line.

7. The method of claim 1 wherein the dissolving step includes infusing the oxygen into the liquid coffee product.

8. The method of claim 7 wherein the infusing includes delivering pressurized oxygen to a coffee moving through a canning line and using a pressure regulator to control a quantity of oxygen dissolved into the coffee.

9. The method of claim 1, further comprising the step of chilling the coffee prior to the step of dissolving oxygen.

10. The method of claim 9, wherein the chilling step includes holding at 33-38° F. for about 24 hours.

11. The method of claim 1, wherein the step of dissolving oxygen occurs until the oxygen level reaches 18-36 ppm.

12. The method of claim 1, wherein said package coffee product contains a liquid portion with dissolved oxygen therein and a headspace portion with oxygen therein.

13. The method of claim 12, wherein said container is a metal can.

14. The method of claim 1, wherein the container is a bottle.

15. The method of claim 1, further comprising the step of heating the sealed container to at least about 145° F. for at least 3 minutes but heated to not more than about 190° F.

16. The method of claim 1, wherein the liquid coffee product maintains at least about 0.5 ppm oxygen dissolved after 180 days in non-cold chain room temperature storage.

17. A packaged coffee product comprising:
a sealed container with a liquid portion comprising coffee with oxygen dissolved therein;
wherein the product is free of *Clostridium botulinum* (*C. bot*) and the liquid portion further includes one or more of the group consisting of: milk, carbohydrate sweetener and artificial sweetener, to create the packaged coffee product wherein the packaged coffee product has a pH of 4.6 or greater wherein the liquid portion has 0.5-9 calories per ounce wherein said packaged liquid coffee product is not subject to temperatures associated with retort processing.

18. The product of claim 17, wherein the sealed container is packaged together with other sealed containers and has been heated prior to packaging to at least about 145° F. for at least 3 minutes but heated to not more than about 190° F.

19. The product of claim 17, wherein the liquid portion has 2-7 calories per ounce.

20. The product of claim 17, wherein the liquid portion has 2-5 calories per ounce.

21. The product of claim 17, wherein the liquid portion contains 18-20 ppm oxygen at equilibrium.

22. The product of claim 17 wherein the sealed container includes a headspace portion containing oxygen.

23. The product of claim 17 wherein the sealed container with the packaged coffee product therein is not exposed to temperatures above 180 deg F.

24. The product of claim 17 further comprising:
a plurality of the packaged coffee products packaged together in a case, pack or pallet wherein prior to packaging in the case, pack or pallet, each of the packaged coffee products while in the sealed container is subjected to temperatures less than 200 deg F., and wherein said packaged liquid coffee products are not subject to temperatures associated with retort processing.

* * * * *